(12) United States Patent
Paluszewski et al.

(10) Patent No.: US 10,286,343 B2
(45) Date of Patent: May 14, 2019

(54) FILTER INCLUDING RFID TAG

(71) Applicant: Pall Corporation, Port Washington, NY (US)

(72) Inventors: Paul J. Paluszewski, Venice, NY (US); Brent VanZandt, Groton, NY (US); Eric Warmuth, Marcy, NY (US)

(73) Assignee: Pall Corporation, Port Washington, NY (US)

( * ) Notice: Subject to any disclaimer, the term of this patent is extended or adjusted under 35 U.S.C. 154(b) by 214 days.

(21) Appl. No.: 15/337,364

(22) Filed: Oct. 28, 2016

(65) Prior Publication Data
US 2018/0117508 A1 May 3, 2018

(51) Int. Cl.
| | | |
|---|---|---|
| *B01D 35/143* | (2006.01) | |
| *B01D 29/21* | (2006.01) | |
| *B01D 35/30* | (2006.01) | |
| *B01D 35/15* | (2006.01) | |
| *B01D 46/00* | (2006.01) | |
| *B01D 46/24* | (2006.01) | |
| *B01D 46/42* | (2006.01) | |
| *B01D 46/52* | (2006.01) | |
| *B01D 29/35* | (2006.01) | |
| *B01D 29/60* | (2006.01) | |

(52) U.S. Cl.
CPC .......... *B01D 35/143* (2013.01); *B01D 29/21* (2013.01); *B01D 29/353* (2013.01); *B01D 29/601* (2013.01); *B01D 29/603* (2013.01); *B01D 29/606* (2013.01); *B01D 35/1435* (2013.01); *B01D 35/15* (2013.01); *B01D 35/30* (2013.01); *B01D 46/009* (2013.01); *B01D 46/0031* (2013.01); *B01D 46/0086* (2013.01); *B01D 46/2411* (2013.01); *B01D 46/429* (2013.01); *B01D 46/523* (2013.01); *B01D 2201/291* (2013.01); *B01D 2201/303* (2013.01); *B01D 2201/52* (2013.01); *B01D 2201/54* (2013.01); *B01D 2201/56* (2013.01); *B01D 2239/0654* (2013.01); *B01D 2239/0695* (2013.01); *B01D 2275/105* (2013.01)

(58) Field of Classification Search
None
See application file for complete search history.

(56) References Cited

U.S. PATENT DOCUMENTS

| | | |
|---|---|---|
| 7,638,042 B2 | 12/2009 | Astle et al. |
| 7,699,989 B2 | 4/2010 | Grzonka et al. |
| 7,892,471 B2 | 2/2011 | Burke et al. |
| 7,898,495 B2 | 3/2011 | Burke et al. |
| 8,501,120 B2 | 8/2013 | Adhikari et al. |

(Continued)

FOREIGN PATENT DOCUMENTS

| | | |
|---|---|---|
| CN | 202962103 U | 6/2015 |
| CN | 105636664 A | 6/2016 |

(Continued)

OTHER PUBLICATIONS

Singaporean Patent Office, Search Report in counterpart Singaporean Application No. 10201708673V, dated Apr. 17, 2018.

(Continued)

*Primary Examiner* — Richard C Gurtowski
(74) *Attorney, Agent, or Firm* — Leydig Voit & Mayer

(57) ABSTRACT

A filter assembly including an RFID tag, for use in monitoring fluid processing, as well as a system and a method for monitoring fluid processing, and a filter for use in the filter assembly, are disclosed.

20 Claims, 23 Drawing Sheets

(56) References Cited

U.S. PATENT DOCUMENTS

| | | |
|---|---|---|
| 8,710,958 B2 | 4/2014 | Yang et al. |
| 2006/0060512 A1 | 3/2006 | Astle et al. |
| 2007/0240492 A1 | 10/2007 | DiLeo et al. |
| 2008/0060983 A1 | 3/2008 | Kleber |
| 2008/0175719 A1 | 7/2008 | Tracey et al. |
| 2009/0246090 A1 | 10/2009 | Burke et al. |
| 2011/0062060 A1 | 3/2011 | Royal et al. |
| 2012/0303204 A1 | 11/2012 | Narisako et al. |
| 2013/0220900 A1 | 8/2013 | Milvert et al. |
| 2014/0222222 A1 | 8/2014 | Magoon et al. |
| 2014/0368311 A1 | 12/2014 | Grover et al. |
| 2015/0290567 A1 | 10/2015 | Chernov et al. |
| 2015/0375143 A1 | 12/2015 | Kathan et al. |
| 2016/0273471 A1 | 9/2016 | Shimpi et al. |

FOREIGN PATENT DOCUMENTS

| | | |
|---|---|---|
| CN | 205287916 U | 6/2016 |
| EP | 1 844 835 A2 | 10/2007 |
| TW | 201333705 A | 8/2013 |
| TW | 201604404 A | 2/2016 |
| WO | WO 2005/113112 A1 | 12/2005 |
| WO | WO 2007/030647 A2 | 3/2007 |
| WO | WO 2014/203378 A1 | 12/2014 |
| WO | WO 2016/022923 A1 | 2/2016 |

OTHER PUBLICATIONS

European Patent Office, Extended Search Report in counterpart European Application No. 17196633.6-1104, dated Mar. 29, 2018.
Taiwanese Patent Office, Office Action in counterpart Taiwanese Application No. 106134912, dated Sep. 17, 2018.

FILTER INCLUDING RFID TAG

BACKGROUND OF THE INVENTION

RFID tags have been used in a variety of industries for a variety of applications. However, there is a need for improved systems and applications including RFID tags.

The present invention provides for ameliorating at least some of the disadvantages of the prior art. These and other advantages of the present invention will be apparent from the description as set forth below.

BRIEF SUMMARY OF THE INVENTION

An embodiment of the invention provides a fluid assembly comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) an RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) an RFID signal generator/controller; and, (vii) a first cable, having a first cable first end and a first cable second end, wherein the first cable first end is coupled to the second antenna, and the second cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna.

A method for monitoring fluid processing in a fluid assembly including an RFID tag and an RFID signal generator/controller according to an embodiment comprises: (A) receiving information regarding fluid passing through a fluid assembly comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) the RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) the RFID signal generator/controller; and, (vii) a first cable, having a first cable first end and a first cable second end, wherein the first cable first end is coupled to the second antenna, and the first cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna.

In some embodiments of the method, the information comprises any one or more of: filter differential pressure, flow rate, and filter element part number, and a preferred embodiment of the method comprises accessing the internet using a cloud- or web-enabled device, and receiving the information.

In another embodiment, a system for monitoring fluid processing comprises an embodiment of the filter assembly, a router gateway providing internet access, the router gateway in communication with the RFID signal generator/controller, and at least one cloud- or web-enabled device capable of accessing the internet and receiving information regarding the filter assembly.

In yet another embodiment, a filter for use in a monitoring system comprises a first end cap; a second end cap; a hollow cylindrical porous filter element comprising a first filter end and a second filter end, the first end cap sealed to the first filter end, and the second end cap sealed to the second filter end; and an RFID tag secured on, or near, the first end cap or the second end cap.

BRIEF DESCRIPTION OF THE SEVERAL VIEWS OF THE DRAWING(S)

Figure 1A:
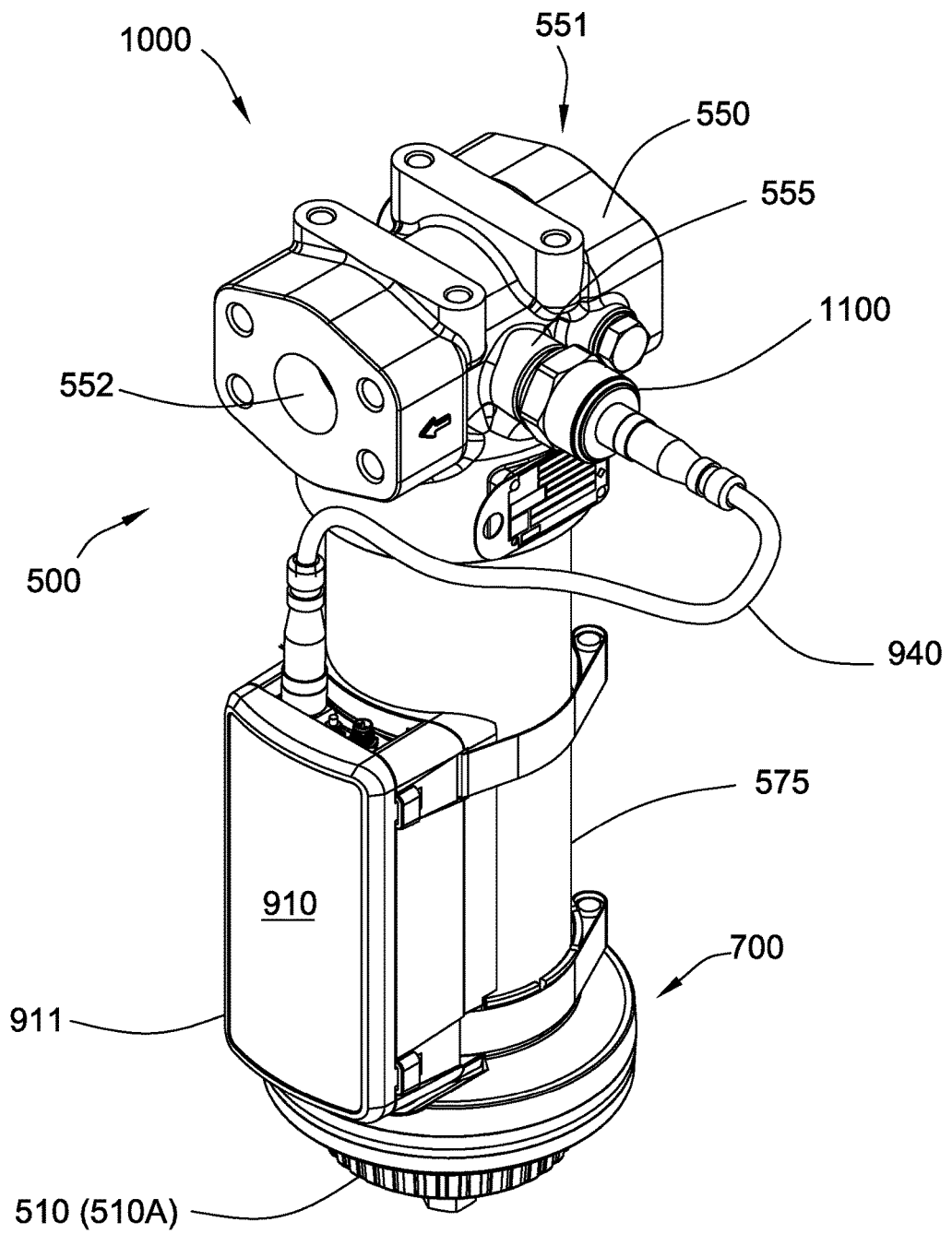
FIG. 1A is an external perspective view of a filter assembly according to an embodiment of the present invention, showing a housing having a first housing end comprising a removable cover, a housing body, and a second housing end, an RFID signal generator/controller, a sensor, and a signal device.
Figure 1B:
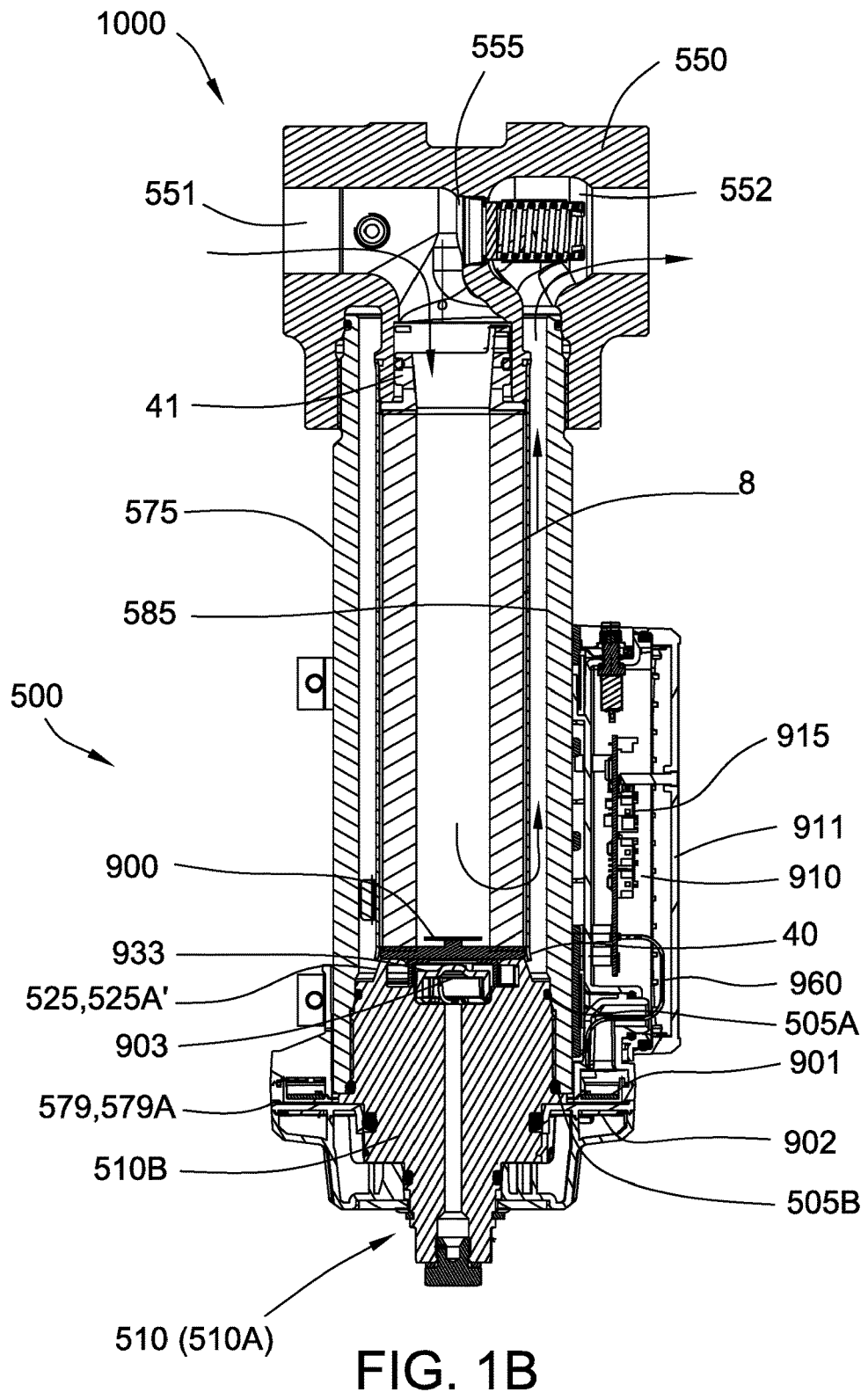
FIG. 1B is a cross-sectional view of the filter assembly shown in FIG. 1A, also showing a first housing end body, the first, second, and third antennas, a third antenna holder, an RFID tag, and a filter.
Figure 1C:
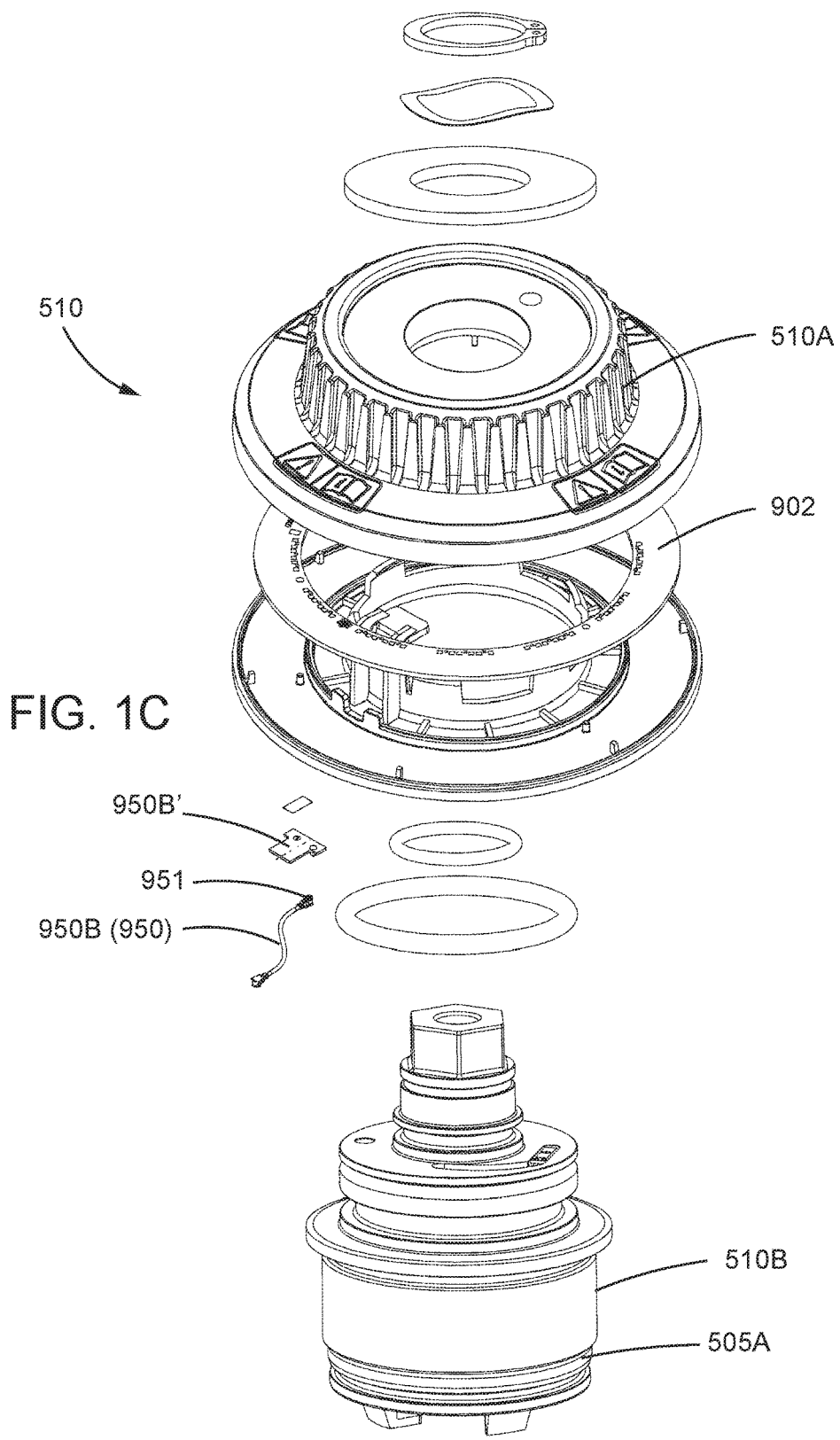
Figure 1D:
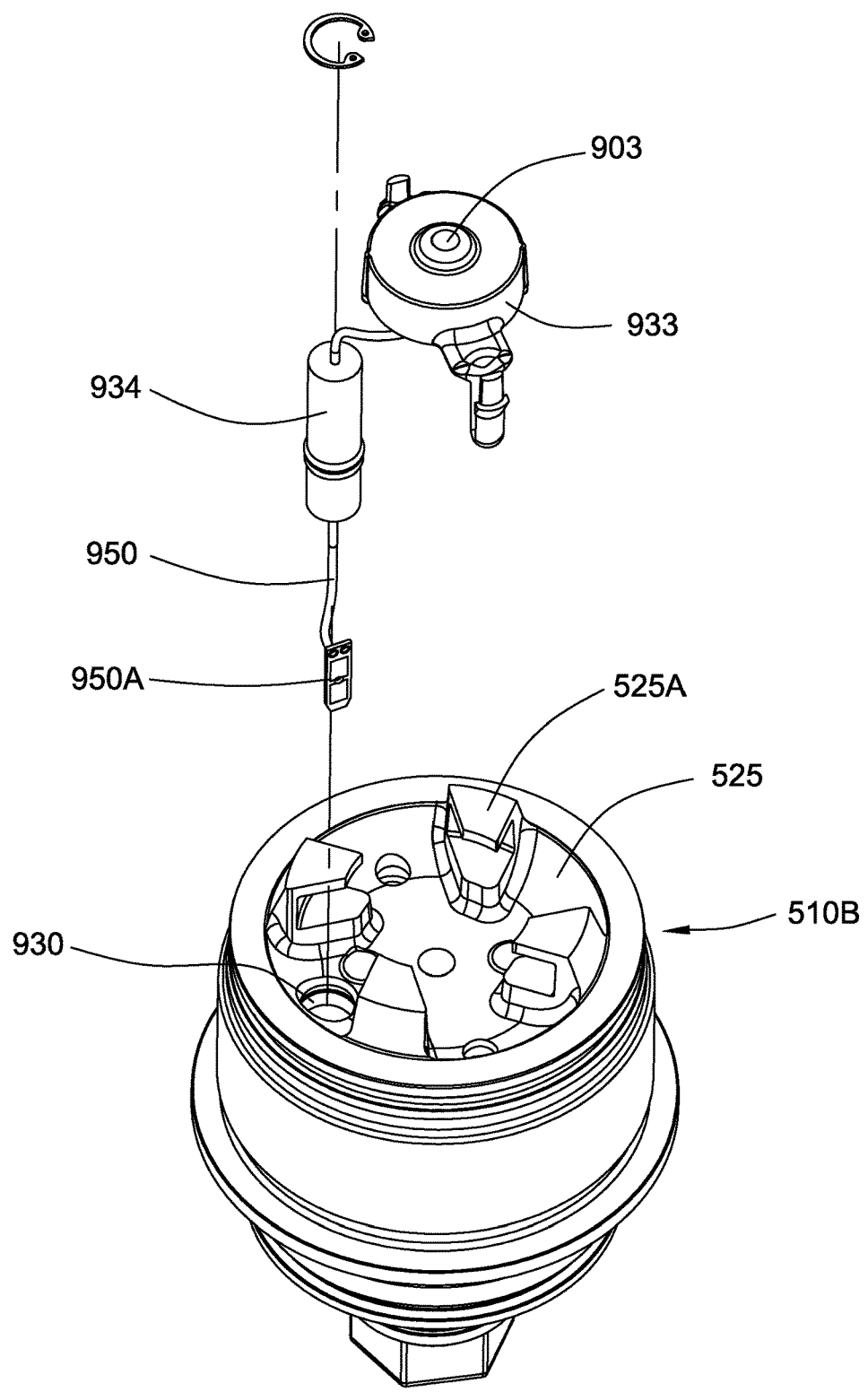

FIG. 1C is an exploded view of the first housing end comprising the removable cover including the second antenna (as well as a cable for connection to the third antenna), and a first housing end body, and FIG. 1D is a bottom view of the first housing end body, also showing the third antenna, and the third antenna holder, before installing the third antenna, and the third antenna holder in the first housing end.

Figure 1E:
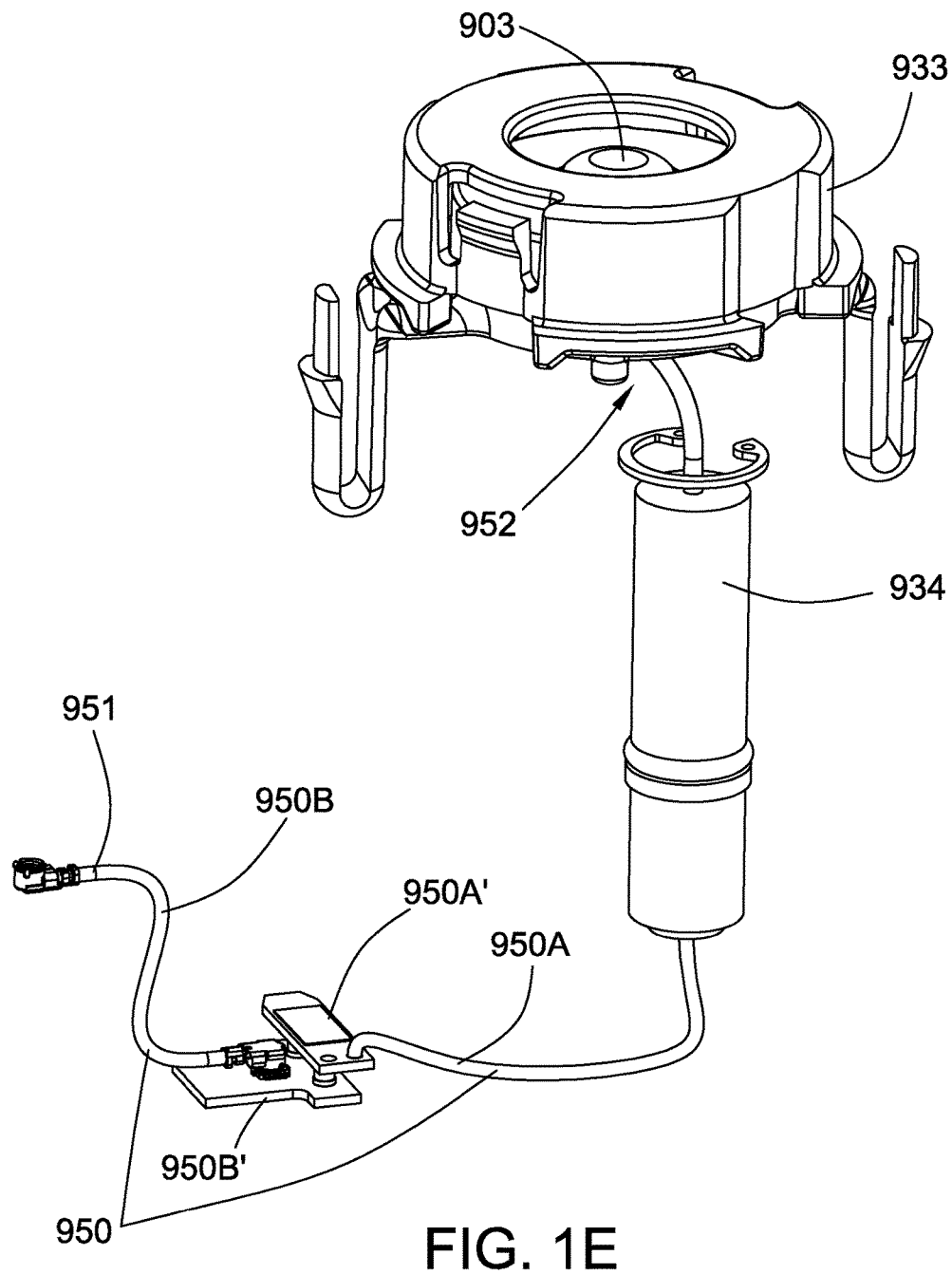
Figure 1F:
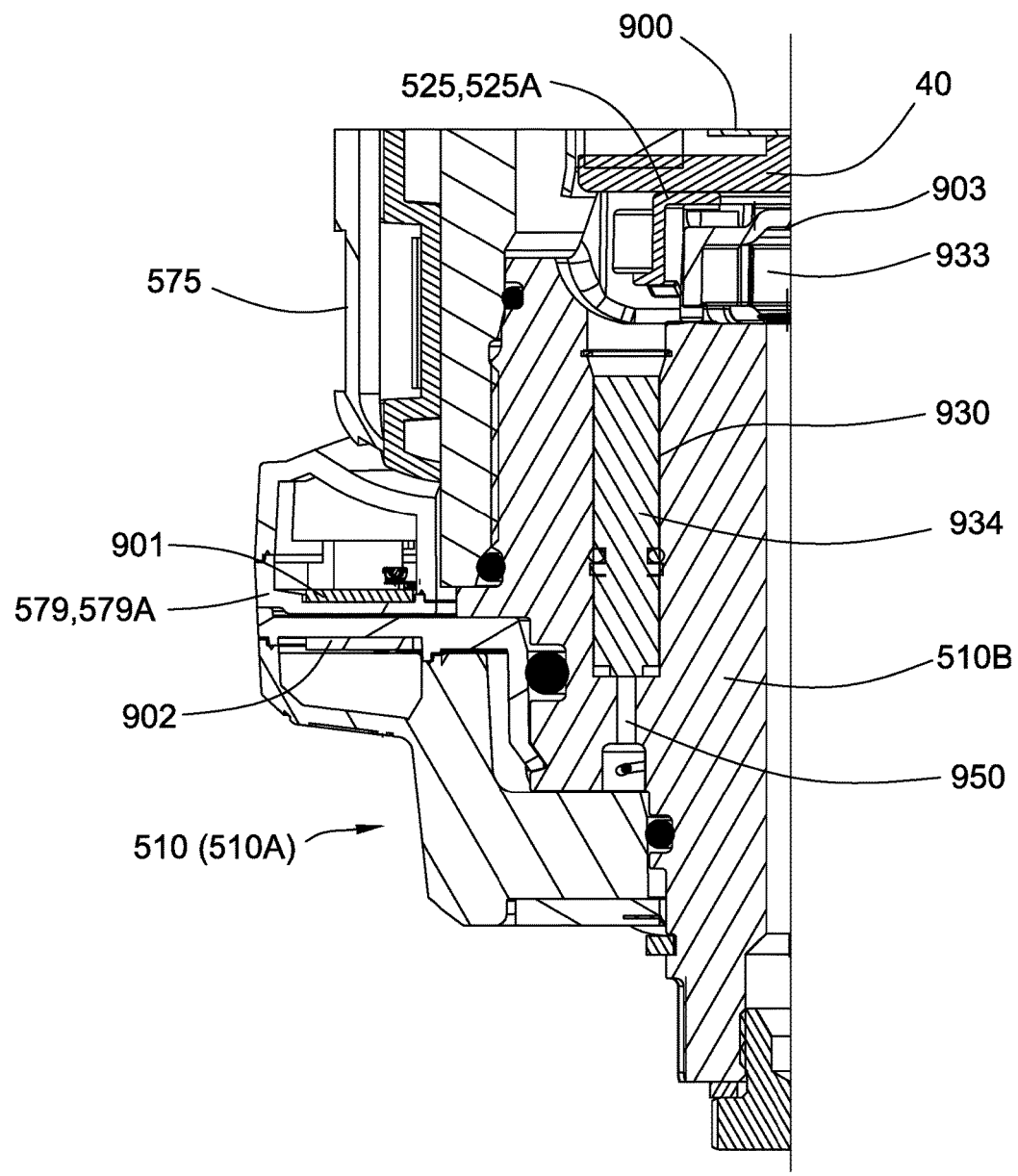

FIG. 1E is an exploded view showing the third antenna 903, a third antenna holder, a gland, and a first cable communicating with the second and third antennas, and FIG. 1F is a partial cross-sectional view, showing the first antenna, the second antenna, the third antenna, a third antenna holder, a gland, and a first cable communicating with the second and third antennas, in the filter assembly.

Figure 1G:
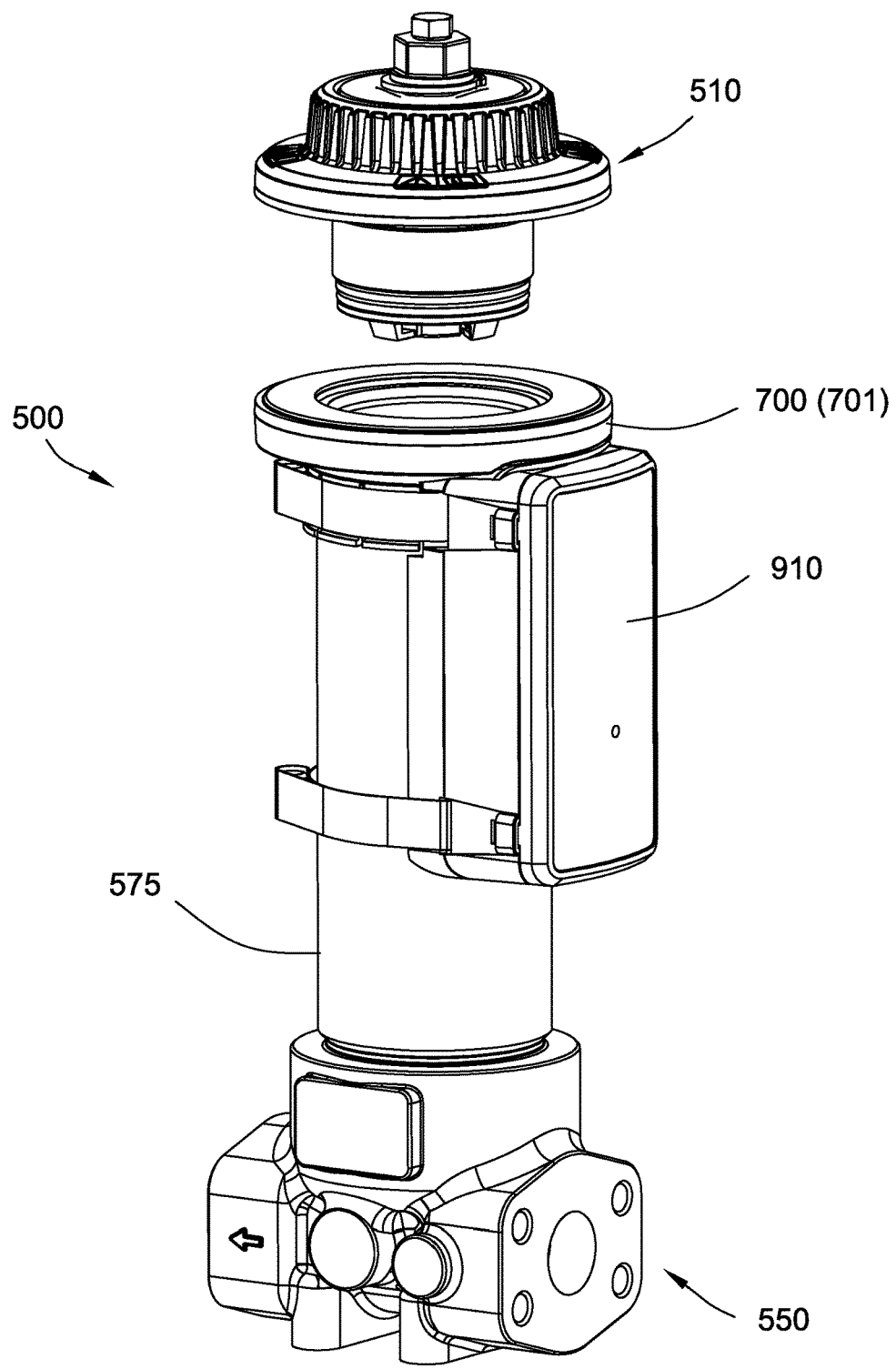

FIG. 1G is a perspective view of the housing having the first housing end, the housing body, and the second housing end, shown in FIG. 1A.

Figure 2:
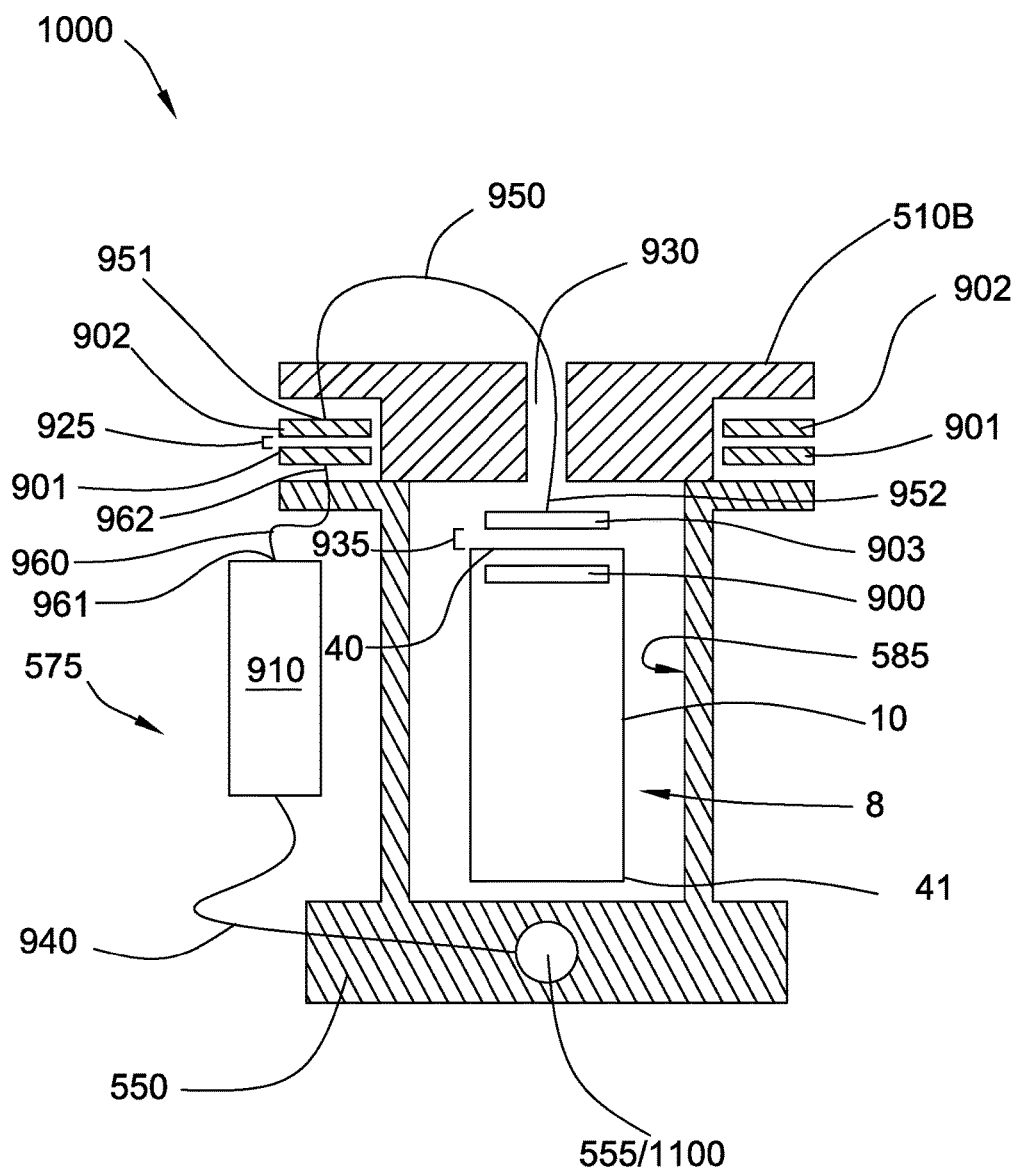

FIG. 2 is a diagrammatic cross-sectional view showing an arrangement of the first, second, and third antennas, the RFID tag, and the RFID signal generator/controller according to an embodiment of the present invention.

Figure 3A:
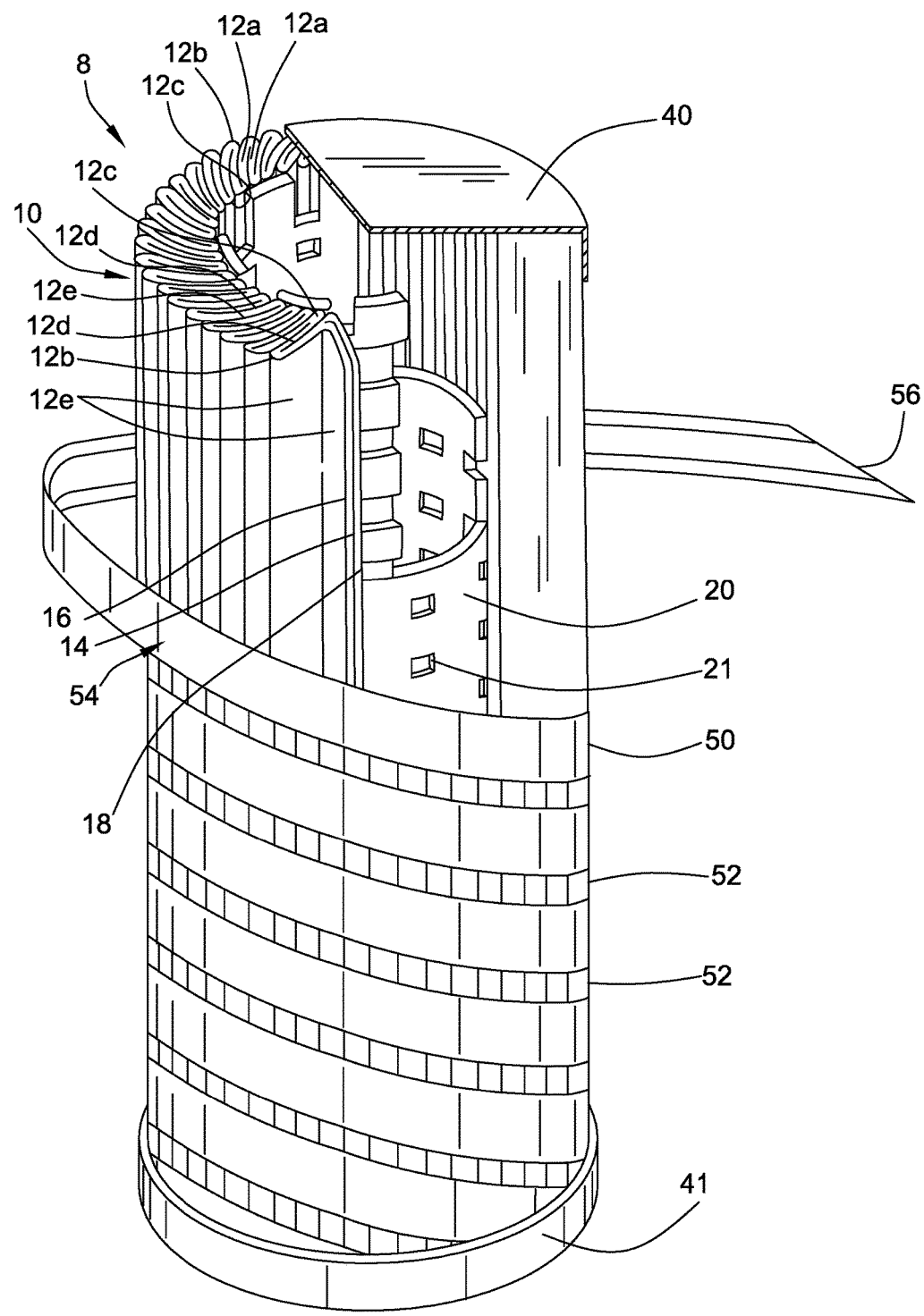
Figure 3B:
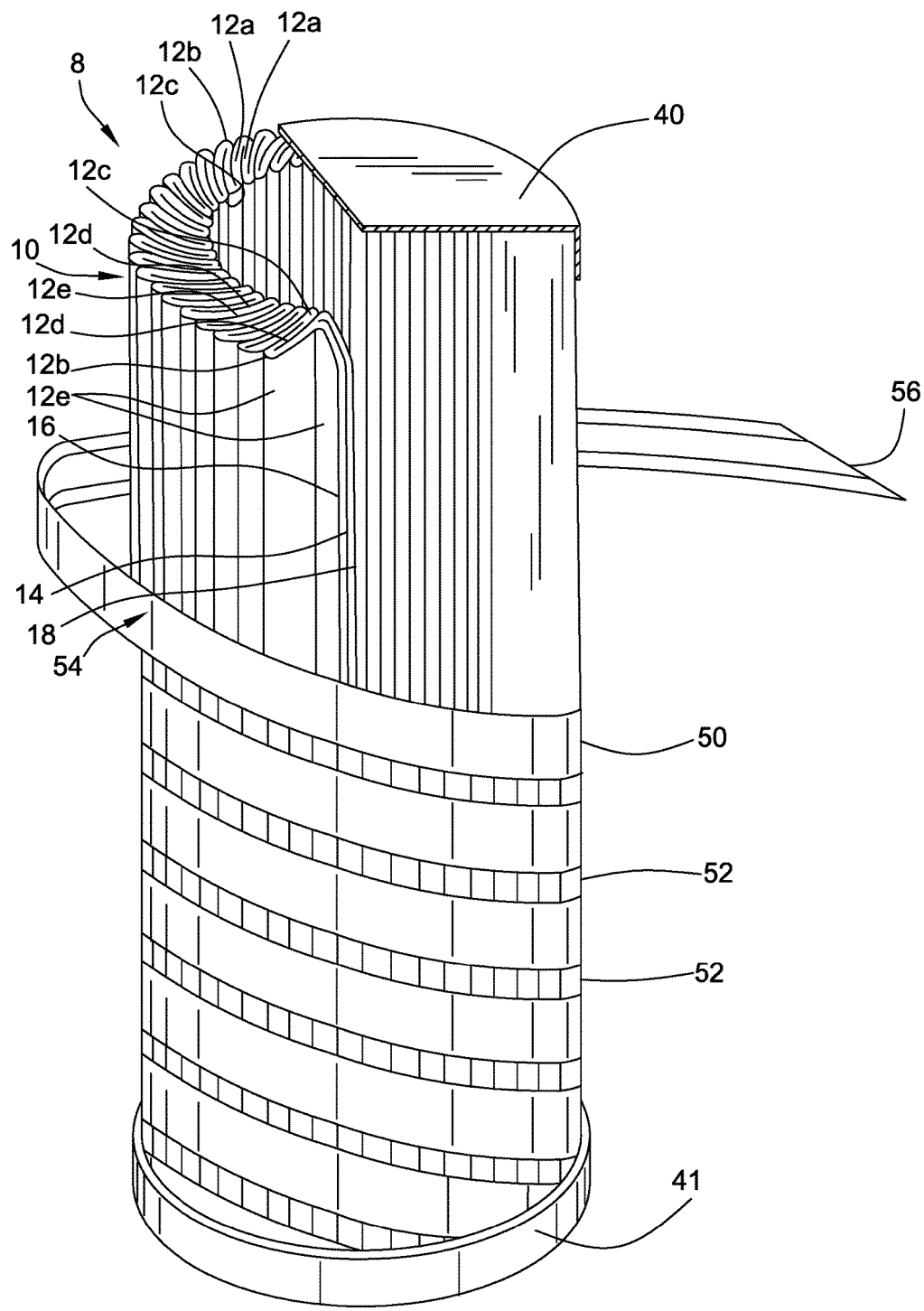

FIGS. 3A and 3B are perspective view of illustrative filters including first and second end caps for use in accordance with embodiments of the invention, wherein one of the end caps (showing the first end cap as a closed end cap) is partially cut away to show the interior of the filter. The filter in FIG. 3A has a core, and the filter shown in FIG. 3B is without a core.

Figure 3C:
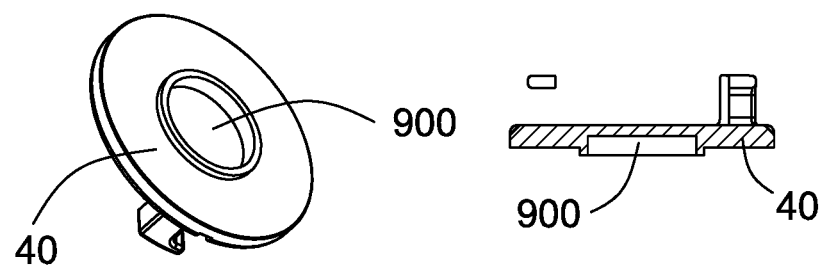
Figure 3D:
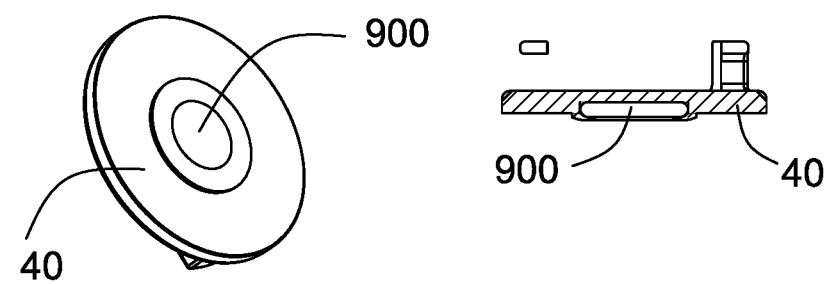
Figure 3E:
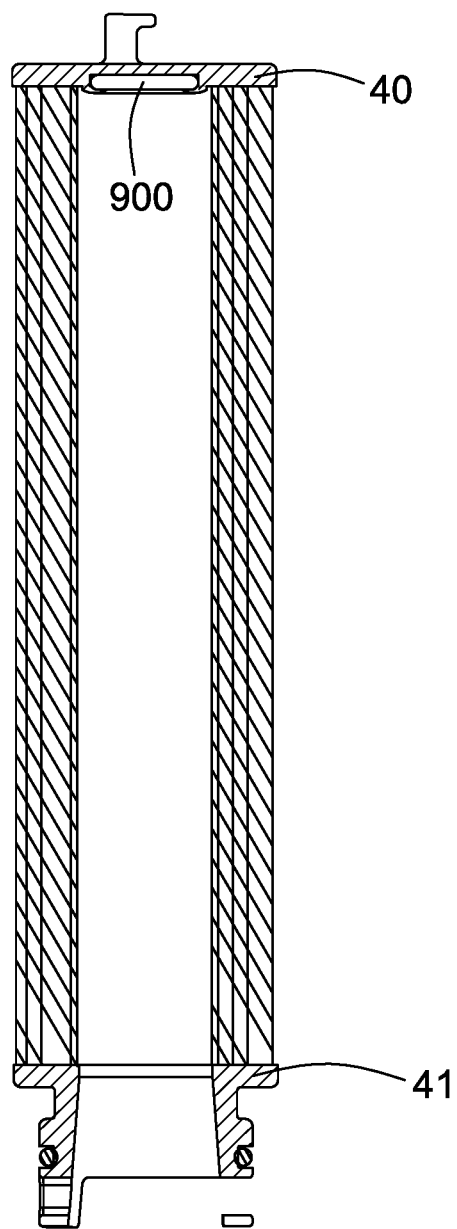

FIGS. 3C and 3D show, diagrammatically, bottom perspective and section views wherein RFID tags are attached to the first (closed) end cap, FIG. 3C showing the RFID attached in a "pocket" in the end cap, FIG. 3D showing the RFID tag staked into place in the end cap. FIG. 3E shows a filter having first and second end caps, including the RFID tag attached to the end cap as shown in FIG. 3D.

FIGS. 4A-4F show RFID tags mounted to supports for use in accordance with embodiments of the invention.

Figure 4A:
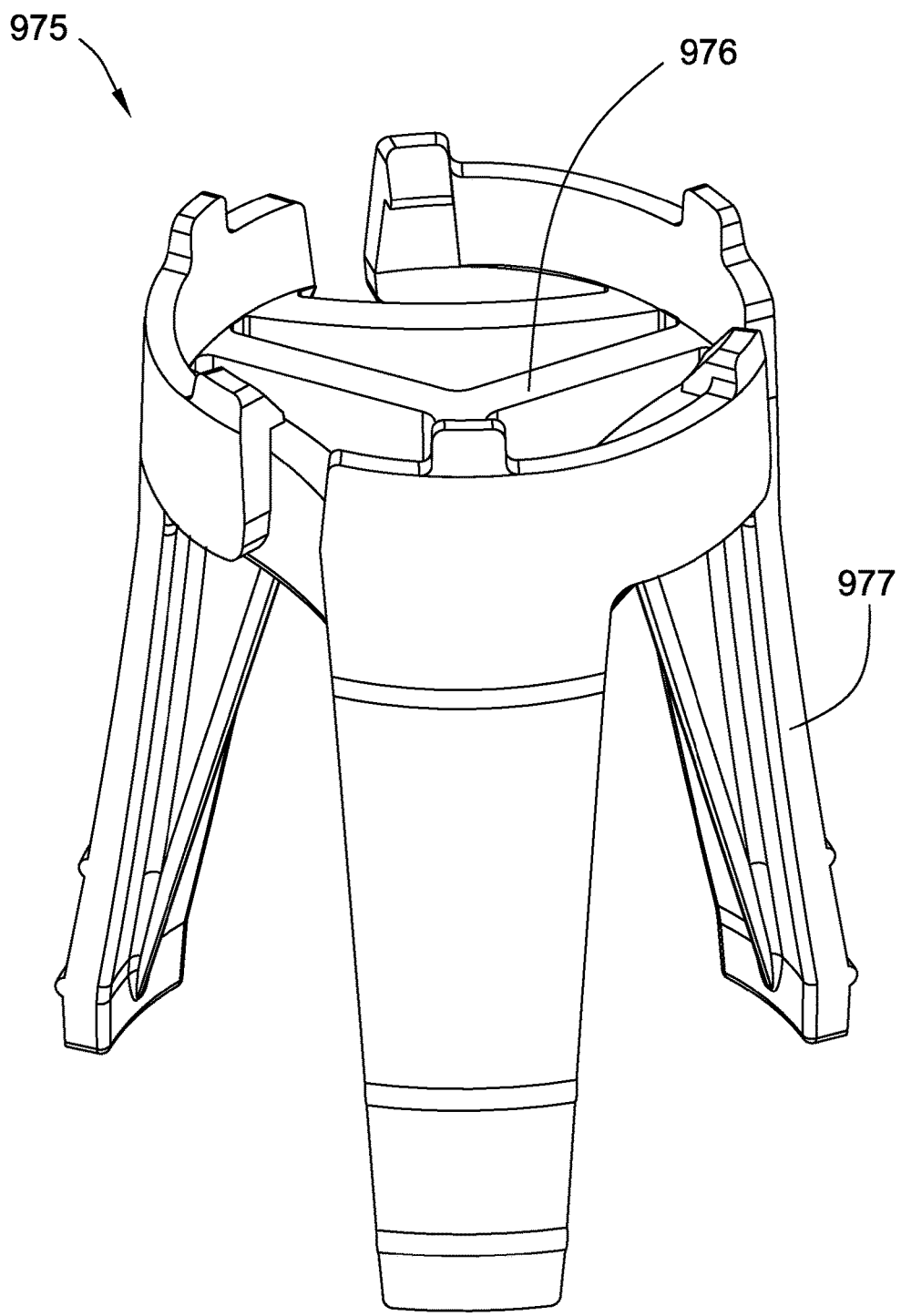
Figure 4B:
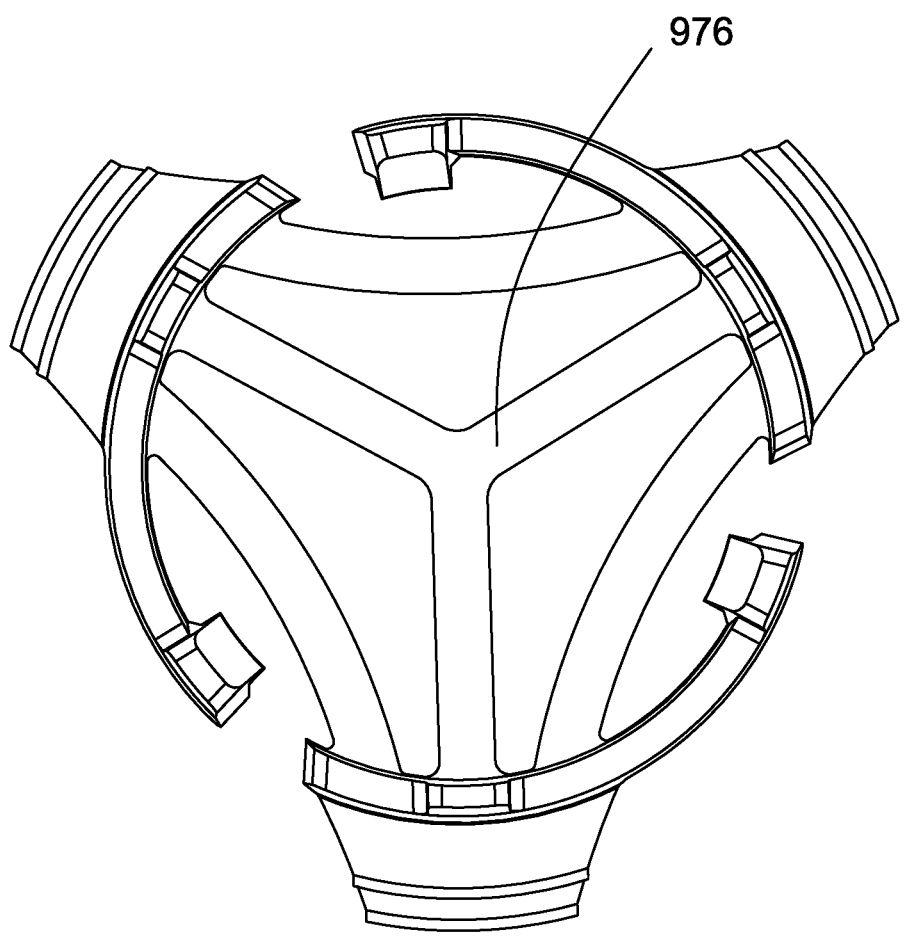
Figure 4C:
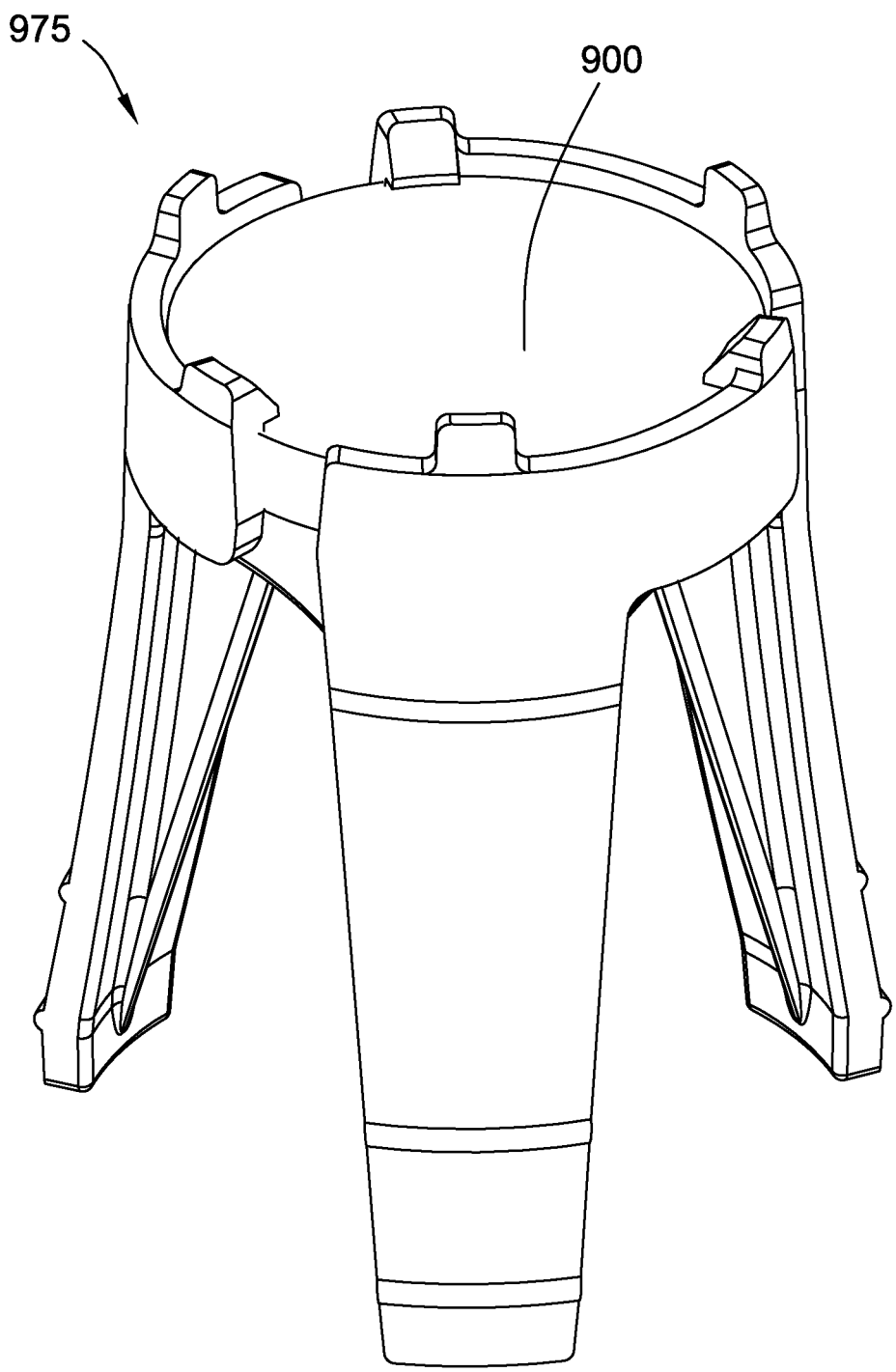

FIG. 4A shows a perspective view and FIG. 4B shows a top view of a support for use in accordance with an embodiment of the invention. FIG. 4C shows a perspective view wherein an RFID tag mounted to the support shown in FIG. 4A.

Figure 4D:
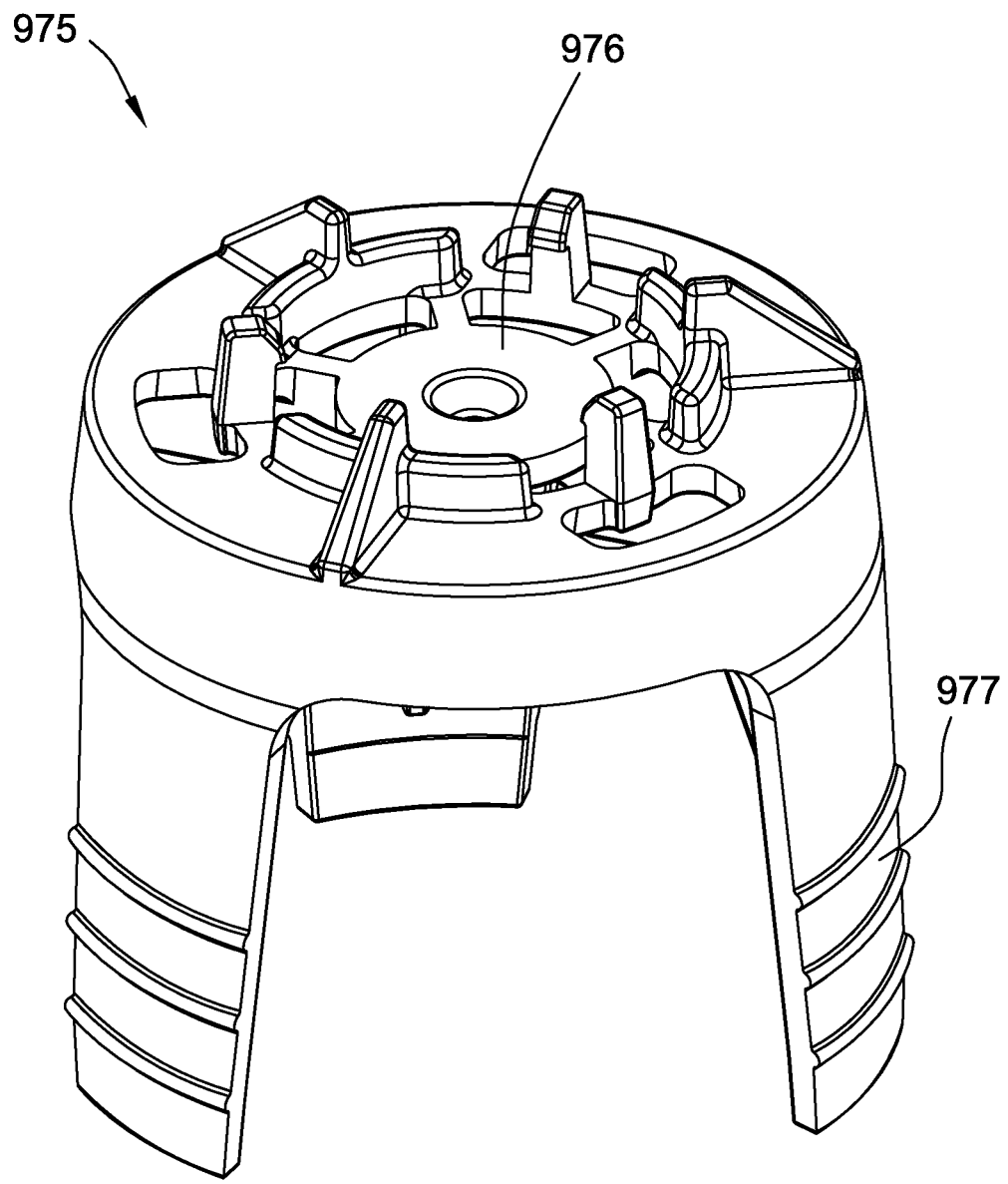
Figure 4E:
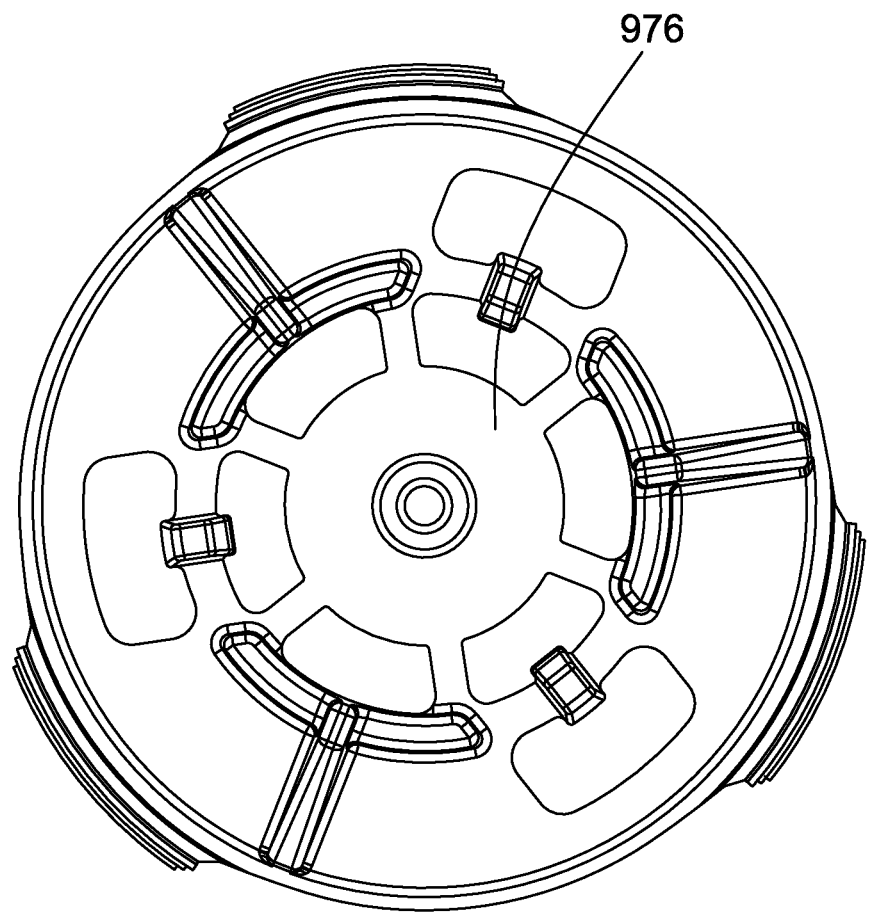
Figure 4F:
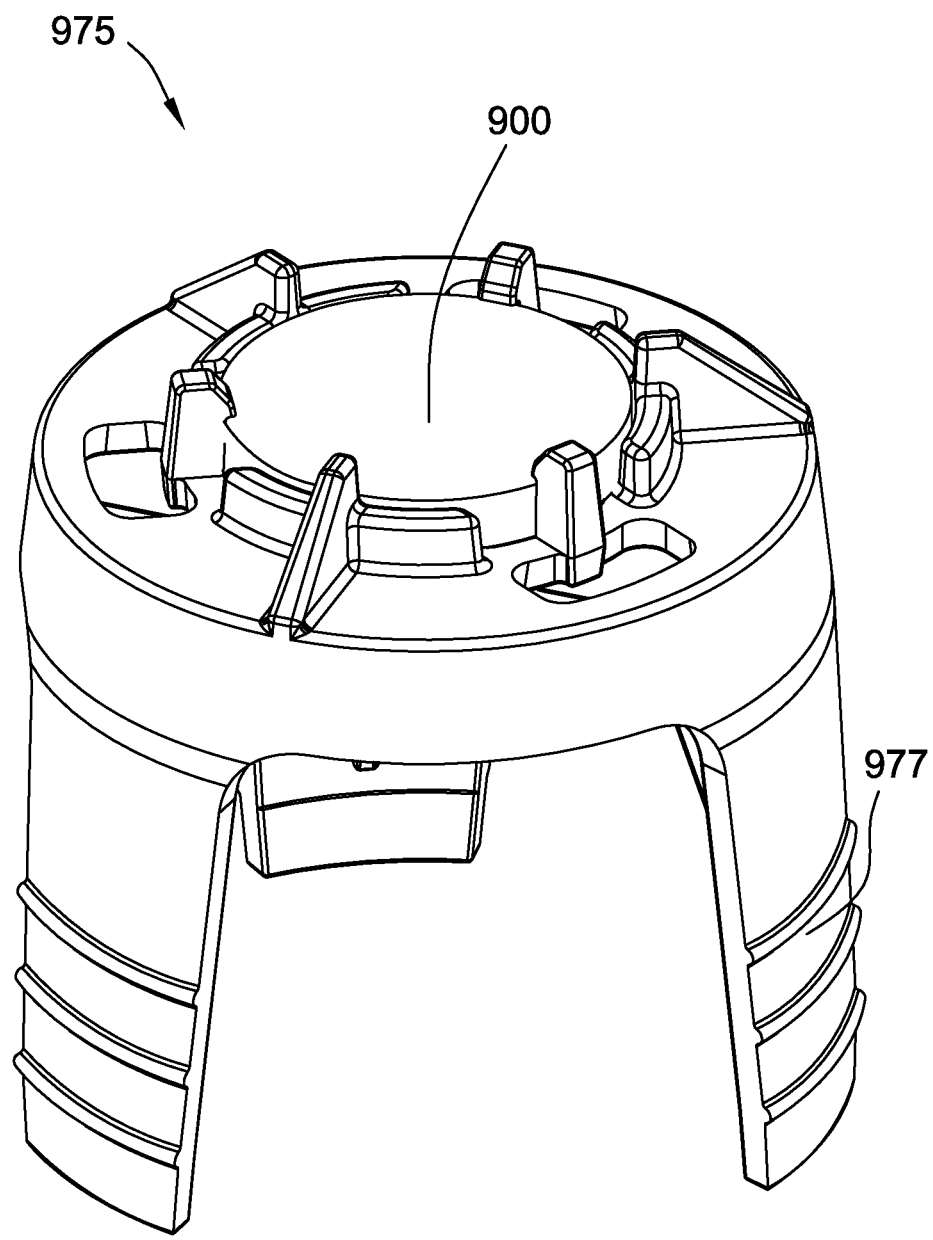

FIG. 4D shows a perspective view and FIG. 4E shows a top view of another support for use in accordance with an embodiment of the invention. FIG. 4F shows a perspective view wherein an RFID tag mounted to the support shown in FIG. 4D.

Figure 5A:
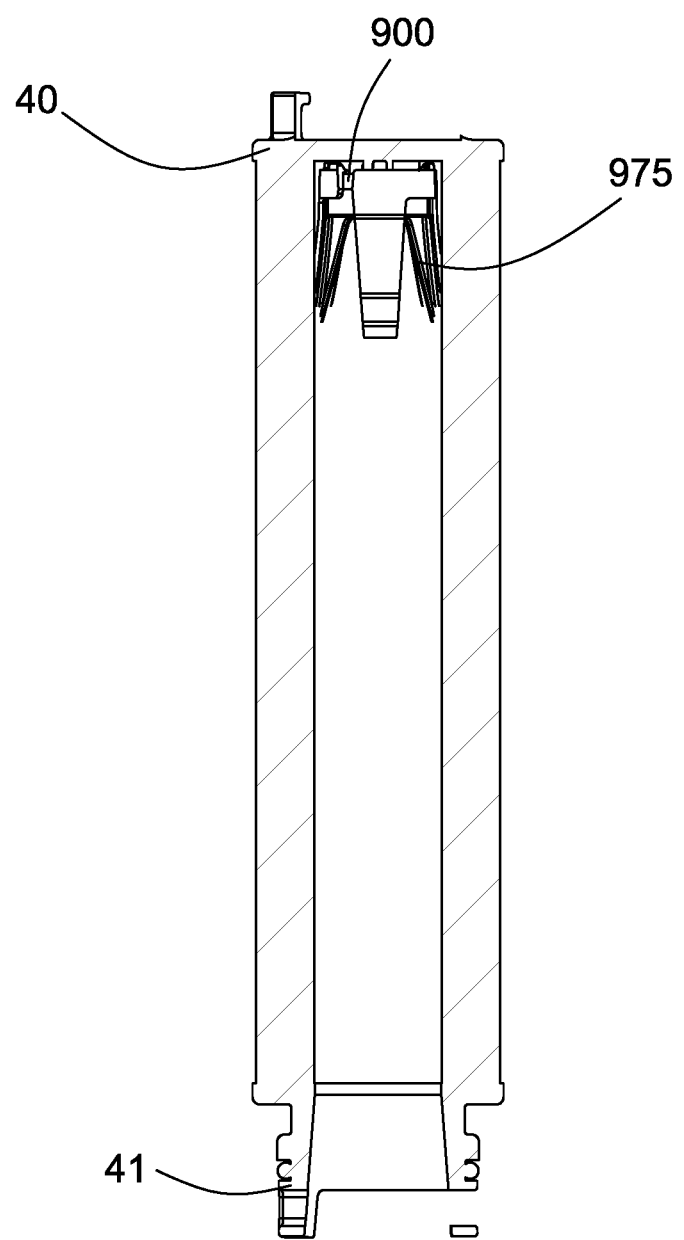

FIG. 5A is a diagrammatic cross-sectional view showing the RFID tag mounted to the support shown in FIG. 4C mounted in a filter housing, wherein the RFID tag faces, and is near, the closed end cap.

Figure 5B:
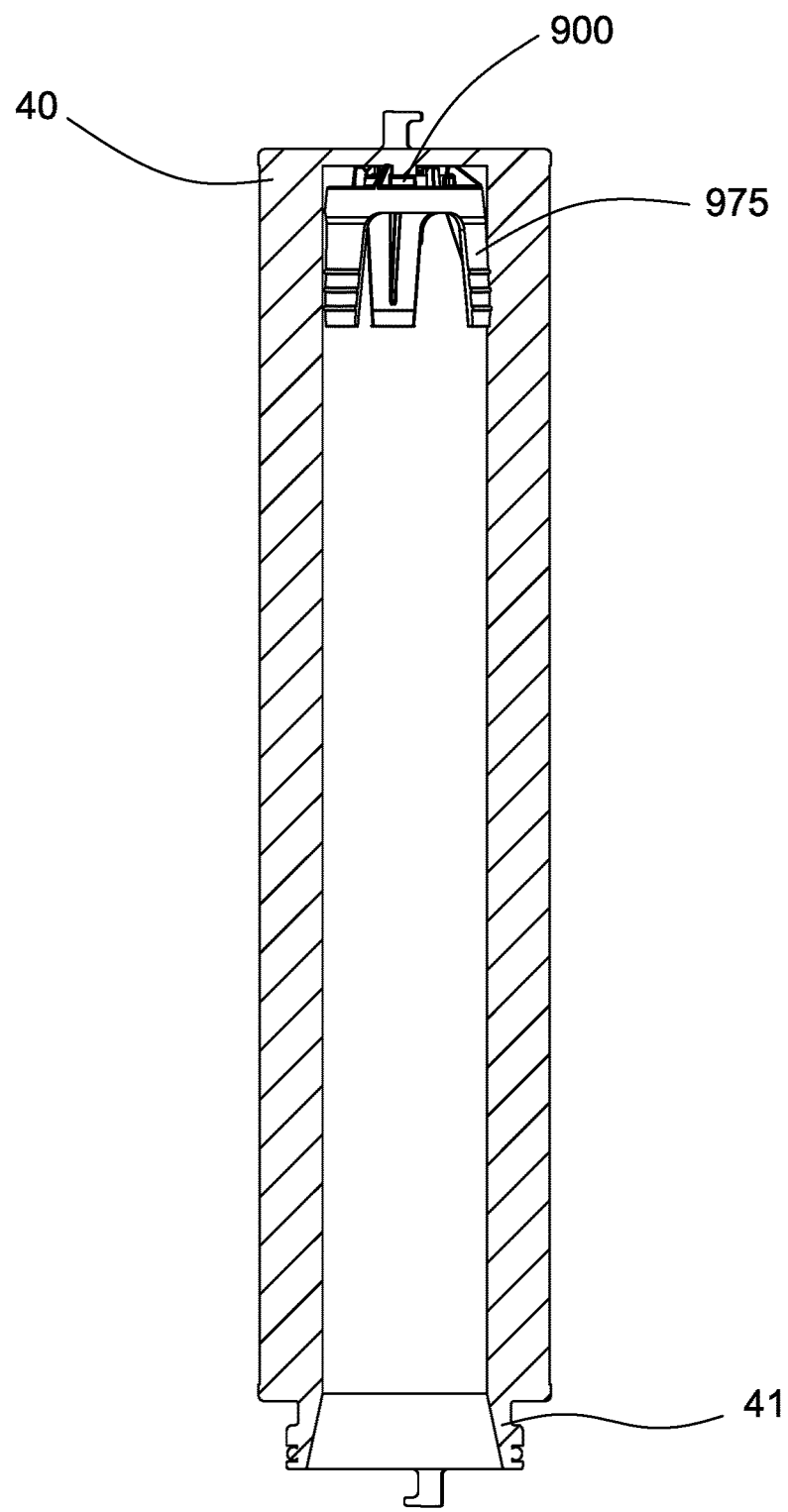

FIG. 5B is a diagrammatic cross-sectional view showing the RFID tag mounted to the support shown in FIG. 4F mounted in a filter housing, wherein the RFID tag faces, and is near, the closed end cap.

Figure 6A:
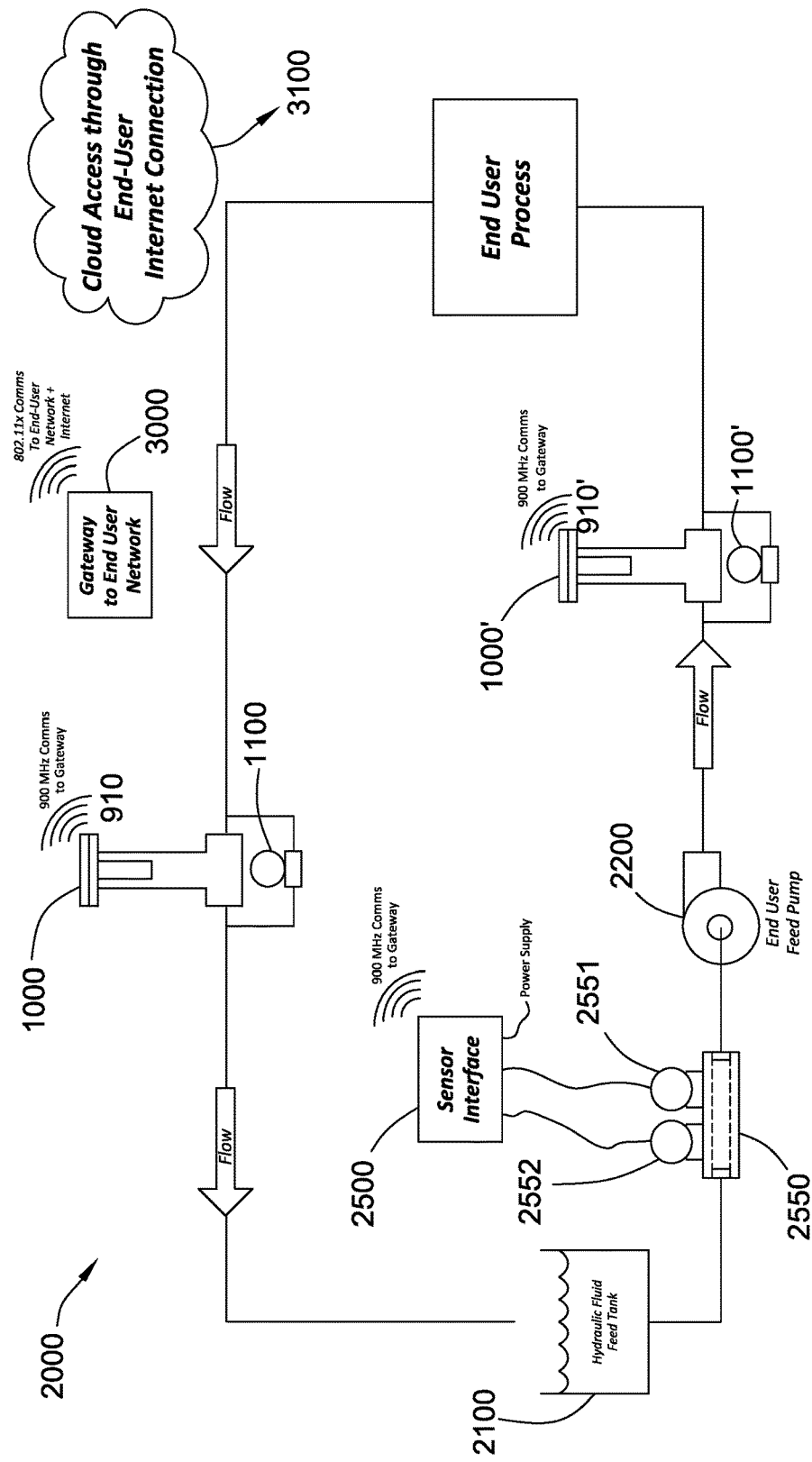
Figure 6B:
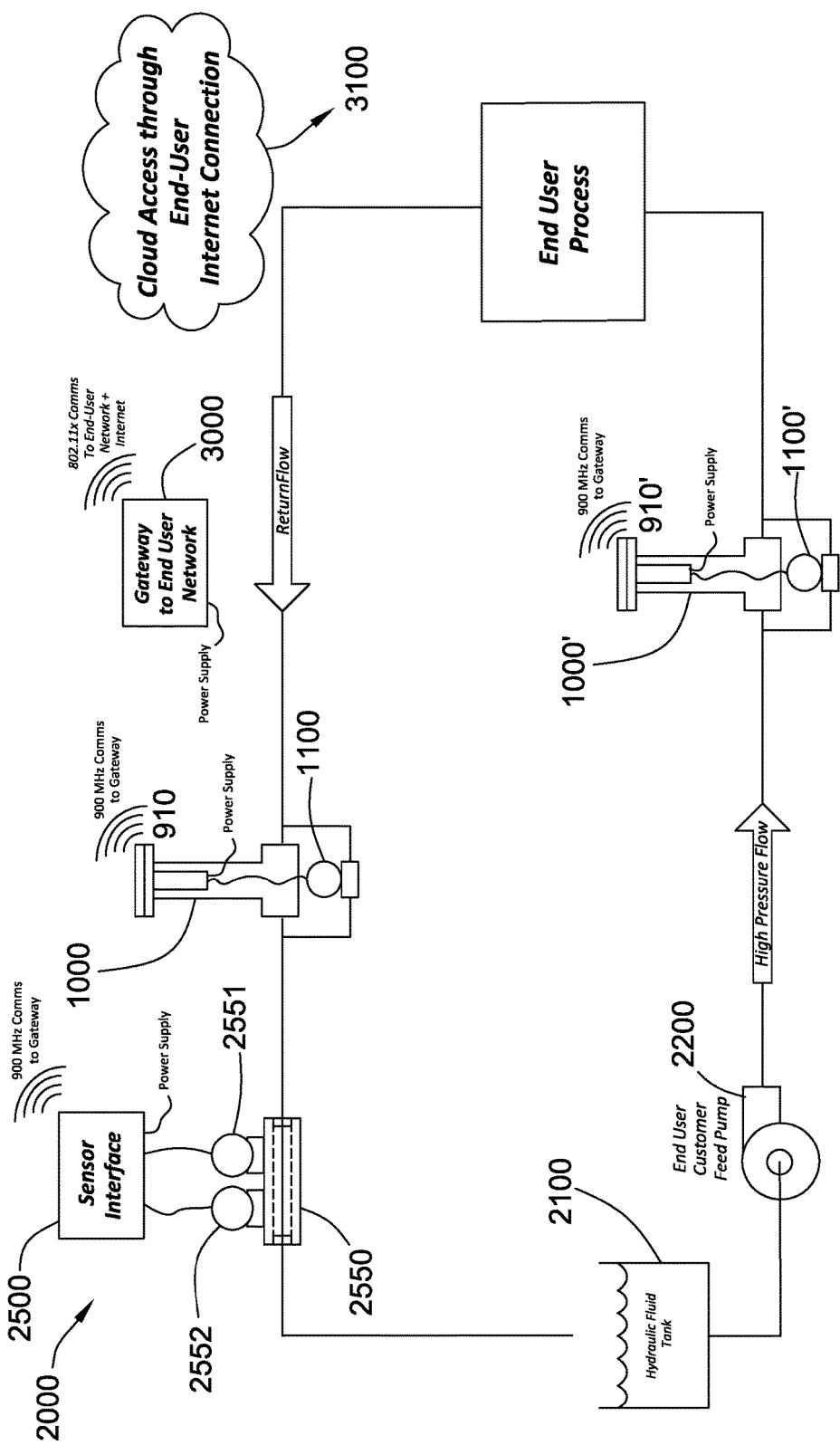

FIGS. 6A and 6B are diagrammatic views showing the transmission of signals through fluid processing systems according to illustrative embodiments of the invention, including the transmission of a signal from the RFID signal generator/controller (with respect to each of a first filter assembly (lower pressure/return line filter assembly) and a second filter assembly (high pressure filter assembly)) through a local router gateway provided with internet access, such that the signal is broadcast to a cloud application or a web application programming interface (API) where an end-user can configure access through a secure system to authorized site personnel via any cloud- or web-enabled device. The illustrated systems also show sensor nodes comprising manifold assemblies (within the low pressure portion of the hydraulic circuits) with sensors external to the filter assemblies, wherein the sensors also provide information to the cloud or web application. In the embodiment illustrated in FIG. 6A, the sensor node is arranged between a fluid reservoir and the inlet of a feed pump, and in the embodiment illustrated in FIG. 6B, the sensor node is arranged between the outlet of the lower pressure filter assembly and the fluid reservoir. The embodiments of systems illustrated in FIGS. 6A and 6B can be operated in a similar manner, with the same components.

Figure 6C:
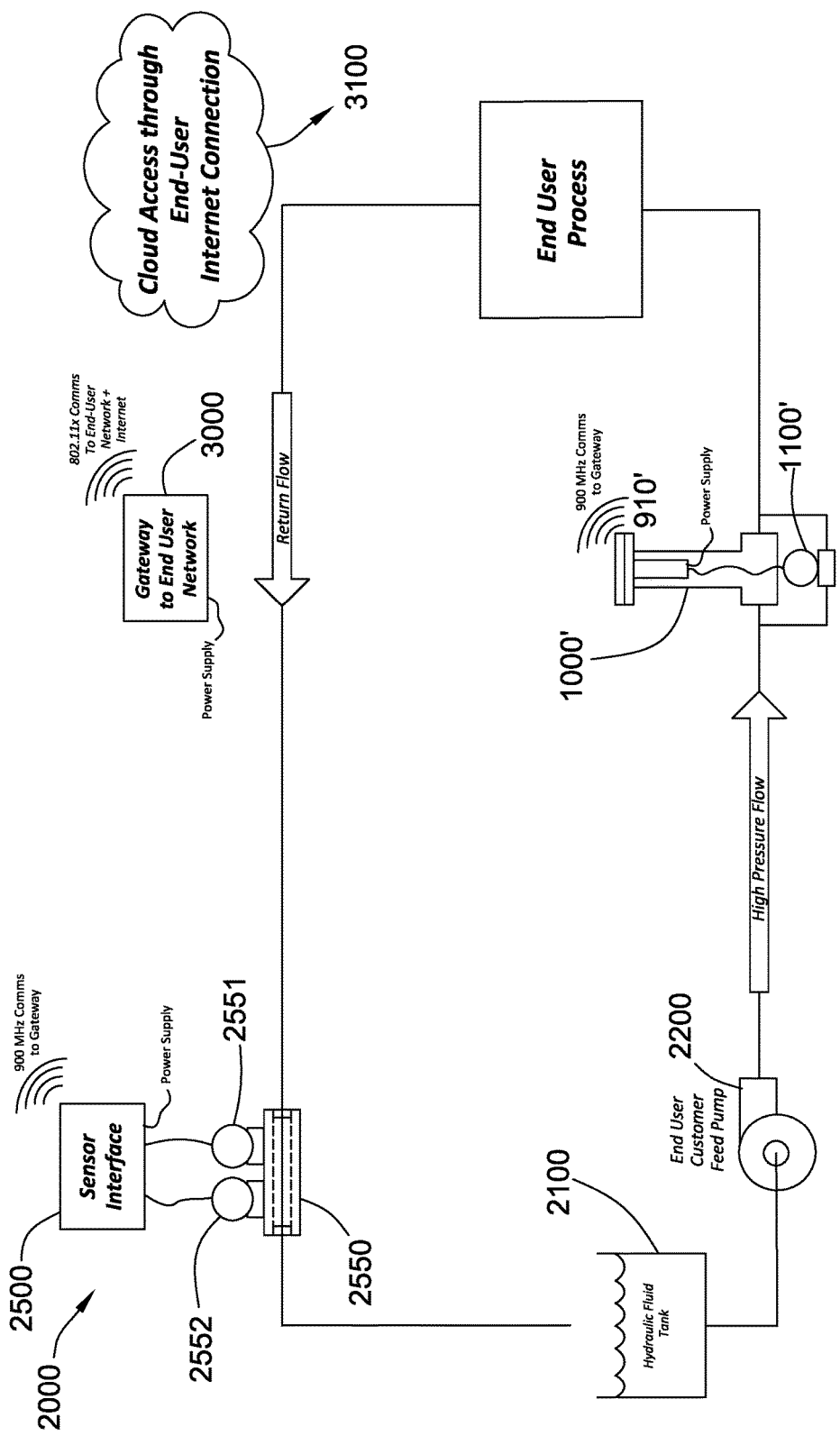

FIG. 6C is a diagrammatic view showing transmission of signals through a fluid processing system according to another illustrative embodiment of the invention, wherein the system includes a single filter assembly (high pressure filter assembly). Similar to the illustrative systems shown in FIGS. 6A and 6B, FIG. 6C shows the transmission of a signal from the RFID signal generator/controller through a local router gateway provided with internet access, such that the signal is broadcast to a cloud application or a web application programming interface (API) where an end-user can configure access through a secure system to authorized site personnel via any cloud- or web-enabled device. The illustrated system also shows a sensor node comprising a manifold assembly (within the low pressure portion of the hydraulic circuits) with sensors external to the filter assembly, wherein the sensors also provide information to the cloud or web application.

DETAILED DESCRIPTION OF THE INVENTION

In accordance with an embodiment of the present invention, a fluid assembly is provided comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) an RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) an RFID signal generator/controller; and, (vii) a first cable, having a first cable first end and a first cable second end, wherein the first cable first end is coupled to the second antenna, and the second cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna.

In an embodiment, the filter assembly further comprises (viii) a second cable, having a second cable first end and a second cable second end, wherein the second cable first end is coupled to the RFID signal generator/controller, and the second cable second end is coupled to the first antenna.

In another embodiment, a system for monitoring fluid processing comprises an embodiment of the filter assembly, a router gateway providing internet access, the router gateway in communication with the RFID signal generator/ controller, and at least one cloud- or web-enabled device capable of accessing the internet and receiving information regarding the filter assembly.

In another embodiment, the system for monitoring fluid processing comprises (A) a filter assembly comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) an RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) an RFID signal generator/controller; and, (vii) a first cable, having a first cable first end and a first cable second end, wherein the first cable first end is coupled to the second antenna, and the first cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna; (B) a router gateway providing internet access, the router gateway in communication with the RFID signal generator/controller, and (C) at least one cloud- or web-enabled device capable of accessing the internet and receiving information regarding the filter assembly.

In some embodiments, the system comprises first and second filter assemblies, each filter assembly comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) an RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) an RFID signal generator/controller; and, (vii) a first cable, having a first cable first end and a first cable second end, wherein the first cable first end is coupled to the second antenna, and the first cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna.

In desired, embodiments of the system can further comprises one or more sensor nodes, that can be arranged external to the filter assembly or assemblies, wherein the sensor node comprises one or more sensors, such as, for example a fluid condition sensor and/or a water sensor (e.g., for monitoring dissolved water).

A method for monitoring fluid processing in a fluid assembly including an RFID tag and an RFID signal generator/controller according to an embodiment comprises: (A) receiving information regarding fluid passing through a fluid assembly comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) the RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) the RFID signal generator/controller; and, (vii) a first cable, having a first cable first end and a first cable second end, wherein the first cable first end is coupled to the second antenna, and the first cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna.

In some embodiments of the method, the information comprises any one or more of the following: filter differential pressure, flow rate, and filter element part number, and a preferred embodiment of the method comprises accessing the internet using a cloud- or web-enabled device, and receiving the information.

A method for monitoring fluid processing in a filter assembly including an RFID tag and an RFID signal generator/controller communicating with a router gateway providing internet access, the method comprising accessing the internet using a cloud- or web-enabled device and receiving information regarding fluid passing through a fluid assembly comprising (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element; (i) the filter comprising a first end cap and a second end cap, and the porous filter element comprising a first filter end and a second filter end, the first end cap sealed to the first filter end, and the second end cap sealed to the second filter end; (ii) the RFID tag secured on, or near, the first end cap or the second end cap; (iii) a first antenna, arranged in or on the housing body; (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween; (v) a third antenna, arranged in or on the first housing end body, wherein the third antenna is spaced from the RFID tag, and the third antenna is arranged to wirelessly send a signal to, and wirelessly receive a signal from, the RFID tag; (vi) the RFID signal generator/controller; and, (vii) a first cable, having a first cable first end and a first cable second end, wherein the first cable first end is coupled to the second antenna, and the second cable second end is coupled to the third antenna; wherein the filter assembly is arranged to allow a signal to pass from the RFID signal generator/controller to the RFID tag via the first antenna, second antenna, and the third antenna, and to allow a signal to pass from the RFID tag to the RFID signal generator/controller, via the third antenna, the second antenna, and the first antenna.

In some embodiments of the method, the information comprises any one or more of the following: filter differential pressure, flow rate, and filter element part number.

In yet another embodiment, a filter for use in a monitoring system comprises a first end cap; a second end cap; a hollow cylindrical porous filter element comprising a first filter end and a second filter end, the first end cap sealed to the first filter end, and the second end cap sealed to the second filter end; and, an RFID tag secured on, or near, the first end cap or the second end cap.

Embodiments of the invention provide for wireless transmission of an RFID signal across an air gap between a fixed electronics enclosure and a removable component which houses an RFID tag reader antenna, in a fluid processing system. Advantageously, servicing a removable component (for example, a filter housing cover and/or a filter element) of a filter assembly can be accomplished without disconnecting/reconnecting one or more cables and/or wires (particularly external cables and/or wires) and/or without the need to "key" or carefully align one or more connections between a fixed electronics module and the removable component. In view of the proximity of the first and second antennas, and the proximity of the third antenna and the RFID tag, there is no need to enhance the signal. Signals can be passed (e.g., the RFID tag can be read) without compromising a closure gasket seal surface. Problems associated with trying to read a signal "through" a metal filter housing can be avoided. There is no need to drain the filter vessel and open the housing to confirm the presence of the filter element, the element part number, the element grade and/or the hours of service. Moreover, manufacturing is simplified by eliminating cabling and failure-prone and expensive housing penetrations and related hardware.

If desired, one or more of any of the following can be monitored and/or determined: presence of a filter element, the filter element part number, the element grade, hours of service filter life (run time), differential pressure, water ingression, and fluid condition (e.g., contamination, dilution, oxidation, additive depletion, and/or presence of particulate(s), fluid temperature, fluid viscosity, fluid density, fluid dielectric, and flow rate). In some embodiments, filter element performance set points and/or operating limits are stored and monitoring includes determining whether one or more stored performance set points and/or operating limits have been exceeded.

Applications for embodiments of the invention include, for example, in-plant fluid processing (e.g., filtration), mobile equipment, and remote installations. If desired, if there is an indication that there is a "fault," e.g., a monitored parameter or condition is outside of a desired range, value, and/or performance set point, or, for example, the wrong filter element has been installed, the filter assembly can be automatically disabled until the "fault" has been addressed.

Preferably, information can be sent wirelessly to the internet, allowing an end user to securely access the information and/or the information can be sent wirelessly to a local smart phone or tablet device, either option allowing, for example, a technician or site engineer to review the information and take action, if appropriate. Providing information to an end-user can provide an early alert that more elaborate laboratory analysis is advisable or required. Demand fulfillment capability can be provided to automatically order replacement filter elements.

The RFID tag can be programmed and/or written to with any information as desired, for example, but not limited to, one or more of any of the following: filter element part number, filter grade, manufacturing batch number, one or more physical parameters of the filter media, and hours of service filter life (run time), differential pressure, water ingression, fluid condition (e.g., contamination, dilution, oxidation, additive depletion, and/or presence of particulate(s), fluid temperature, fluid viscosity, fluid density, fluid dielectric, and flow rate), filter element performance set points and/or operating limits.

The RFID tag can be mounted on (including in), or near (e.g., adjacent to), an end cap (e.g., directly mounted, or mounted via a support, or embedded within an end cap). Typically, the RFID tag is arranged near the center of an end cap (e.g., the center of the major surface of a closed end cap, or the center of the opening of an open end cap).

Using processes known in the art, the RFID tag may be secured by injection molding into a support or an end cap, or may be bonded to the support or end cap via an epoxy potting, ultrasonic welding, adhesives, etc.

The RFID signal generator/controller can include functionality allowing it to write information (e.g., data) to the RFID tag. The RFID signal generator/controller can be interfaced with various sensors such as, but not limited to, a fluid property sensor and/or a differential pressure sensor, and is capable of electromagnetic wireless connection with a data receiver, such as one or more of any of the following: the internet, a smartphone, and a tablet device. The RFID signal generator/controller can use Bluetooth® or Wi-Fi as a wireless interface. Data can broadcast to the web (e.g., web application programming interface (API)) or the cloud where the end user may configure access through secure means to authorized site personnel via any web or cloud enabled device. If desired, the RFID signal generator/controller can be programmed (e.g., with access to predictive algorithms) and can report, for example, historical trends of data as reported by the various sensors.

In some embodiments, the filter assembly includes a signal device, for example, a changeable visual signal indicator such as an illuminatable light located associated with the filter housing, for example, arranged between a housing end and the housing body. The indicator alerts the user or operator to an issue with the filter device, such as, e.g., loss of communication or internet connectivity. In some embodiments, a single 2- or 3-color LED beacon is provided. A steady green LED beacon light indicates that there are no issues with the filter, e.g., a healthy, uninterrupted connection to the network; a flashing amber and/or red light indicates there are issues present, e.g., connectivity issues, etc. An indicator such as a LED beacon light may have a generally annular shape (e.g., with an outer surface shaped to generally correspond to the outer diameter of the housing) in order to provide 360 degree visibility.

Each of the components of the invention will now be described in more detail below, wherein like components have like reference numbers.

FIG. 1A is an external perspective view, and FIG. 1B is a cross-sectional view, of a filter assembly 1000 according to an embodiment of the present invention, showing a housing 500 for receiving a filter, the housing having a first housing end 510 comprising a removable cover 510A, a first housing end body 510B, a housing body 575, and a second housing end 550, an RFID signal generator/controller 910, preferably attached to the housing body (the RFID signal generator/controller having a cover 911) and a sensor 1100. The housing can have various shapes for receiving a filter and various configurations for providing at least one inlet and at least one outlet (wherein a fluid flow path is defined between at least one inlet and at least one outlet, and when a filter is disposed in the housing, the filter is disposed across the fluid flow path, an "inside-out" fluid flow path is illustrated with arrows in FIG. 1B), and preferably includes one or more sensor ports allowing attachment of one or more sensors. In the illustrated embodiment, the second housing end 550 includes an inlet 551 and an outlet 552 and a sensor 1100 is attached to the second housing end via a sensor port 555.

The illustrated filter assembly also includes a signal device or indicator 700, shown as an annular ring 701 such as an LED beacon light, arranged between the first housing end cap and the housing body.

FIG. 1B is cross-sectional view of the filter assembly shown in FIG. 1A, also showing an RFID signal generator/controller module 915 comprising electronic circuitry, a first antenna 901, a second antenna 902, a third antenna (RFID antenna) 903, a third antenna holder 933, an RFID tag 900, and a filter 8.

FIG. 1C is an exploded view of the first housing end comprising a removable cover 510A and a first housing end body 510B, and FIG. 1D is a bottom view of the first housing end body 510B, also showing the third antenna 903, and the third antenna holder 933, a gland 934 (to be located within a bore 930) before installing the third antenna, the third antenna holder, and the gland in the first housing end body.

FIG. 1E is an exploded view showing the second antenna 902, the third antenna 903, the third antenna holder 933, the gland 934, and the first cable 950 communicating with the second and third antennas (first cable 950 illustrated in FIG. 1E as comprising subcables 950A and 950B, connected via spring post connectors 950A' and 950B'), and FIG. 1F is a partial cross-sectional view, showing the second antenna, the third antenna, the third antenna holder, the gland, and the first cable communicating with the second and third antennas, in the filter assembly.

The filter assembly can include additional elements such as retainer clips, washers, o-rings, as shown in, for example, FIGS. 1B-1F. FIGS. 1B and 1F also show, at the bottom of each view, connected to first housing end 510, a plug that, that can function as, for example, a drain plug or a vent plug, depending on the orientation of the housing. For example, when the housing is oriented as shown in FIG. 1B, the plug covers a drain port, and in the reverse orientation, the plug covers a vent port.

FIG. 2 is a diagrammatic cross-sectional view showing an arrangement of the first, second, and third antennas (901, 902, 903), the RFID tag 900, and the RFID signal generator/controller 910 according to an embodiment of the present invention. In this illustrated view, the RFID tag is arranged near a closed filter end cap 40 of a filter 8 having a porous filter element 10. In this illustrative arrangement, the second antenna is arranged in the removable cover 510A; the first antenna is arranged on the housing body 575, wherein the first antenna 901 and the second antenna 902 are generally coaxially arranged and separated by a gap 925 (typically in the range of from about 0.5 mm to about 10 mm) such that the first antenna and the second antenna are inductively coupled, allowing a wireless signal to pass therebetween; the third antenna 903 is arranged in the first housing end body, wherein the third antenna (RFID antenna) 903 is spaced (935) from (typically, a space from in the range of about 5 mm to about 15 mm), and proximate to, the RFID tag, and the third antenna is arranged to wirelessly send a signal to, and wirelessly receive a signal from, the RFID tag.

Accordingly, using FIGS. 1B and 2 for reference, the filter assembly 1000 includes an RFID signal generator/controller 910, wherein the filter assembly is arranged to allow a signal to pass from the RFID signal generator/controller 910 to the RFID tag 900 via the first antenna 901, second antenna 902, and the third antenna 903, and to allow a signal to pass from the RFID tag to the RFID signal generator/controller, via the third antenna, the second antenna, and the first antenna.

A variety of RFID signal generator/controllers can are suitable for use in accordance with embodiments of the invention.

A variety of RFID tags (including micro-electro-mechanical systems (MEMS) tags), are suitable for use in accordance with embodiments of the invention. The RFID tag, which is preferably passive (no power source (such as a battery)), but can be semi-passive (with power source, but draw power from the reader), or active (with transmitter and power source), can be arranged in a variety of locations. The RFID tag can be chipless (e.g., using time-domain reflectivity or frequency signature techniques) or the RFID tag can include a microchip, that can comprise a "read-write microchip," a "read-only microchip," or a "read once, read many microchip." The RFID tag can be mounted to, on, or in an end cap (e.g., directly mounted, or mounted via a support, or embedded, during or after the end cap molding process, within an end cap). Typically, the RFID tag is arranged near the center of an end cap (e.g., the center of the major surface of a closed end cap, or the center of the opening of an open end cap).

FIGS. 3A and 3B show perspective views illustrative filters 8 including a porous filter element 10 and first end cap 40 (wherein the first end cap is a closed end cap) and a second end cap 41 (wherein the second end cap is an open end cap) for use in accordance with an embodiment of the invention. The illustrated filters comprise a pleated porous filter element with a spiral wrap member surrounding the outer surface of the pleats.

FIG. 3D shows an end view into the filter 10 shown in FIG. 3A, showing the RFID tag 900 directly attached to the interior of the first (closed) end cap 40. FIGS. 3C, 3D, and 3E show illustrative direct attachments on the cap, wherein FIG. 3C shows a "pocket" in the surface of the end cap for receiving the RFID tag, and FIG. 3D shows the RFID tag staked into place. FIG. 3E shows first (closed) and second (open) end caps, including the first end cap as shown in FIG. 3D.

If desired, the RFID tag can be mounted to a support for use in accordance with an embodiment of the invention, and the support can be associated with an open or closed end cap.

FIGS. 4C and 4F shows an RFID tag 900 mounted to a support 975 for use in accordance with an embodiment of the invention (FIG. 4B shows an exploded view of the support and tag). The illustrated support 975 includes an exterior surface, a top, a bottom, a mounting surface 976, and one or more legs 977, and the illustrated support has a generally annular shape. The top of the support includes the mounting surface 976, wherein the RFID tag 900 is located on the mounting surface. The one or more legs may extend from the bottom of the support (as shown) or from the exterior surface. The legs may extend outwardly in a generally axial direction. The legs may also include one or more feet or protrusions for engaging a surface of the filter and/or of the end cap.

FIGS. 5A and 5B show a support and RFID tag inserted in the filter through the open end cap to a position near the second end cap, wherein the RFID tag faces (in some embodiments, contacts) the surface of the second (closed) end cap facing the interior of the filter.

A variety of antennas are suitable for use in accordance with embodiments of the invention. Typically, the first and second antennas each have an annular (ring-shaped), or generally annular, form, wherein the inner diameters of the ring-shaped antennas are each at least slightly greater than the outer diameter of the filter.

In some embodiments, the filter assembly includes one or more cables. For example, FIG. 2 shows a first cable 950, having a first cable first end 951 and a first cable second end 952, wherein the first cable first end is coupled to the second antenna 902, and the first cable second end is coupled to the third antenna 903 (in the embodiment illustrated in FIG. 1E, first cable 950 comprises subcables 950A and 950B, connected via spring post connectors 950A' and 950B'). FIG. 2 also shows a second cable 960, having a second cable first end 961 and a second cable second end 962, wherein the second cable first end is coupled to the RFID signal generator/controller 910, and the second cable second end is coupled to the first antenna 901.

Preferably, the filter assembly includes at least one sensor, such as a fluid condition sensor, that communicates with the RFID signal generator/controller, such as a differential pressure sensor (e.g., arranged between the inlet and outlet) and/or a fluid property sensor, and a variety of sensors are suitable for use. For example, using FIGS. 1A and 2 for reference, the illustrated filter assembly includes a sensor 1100 such as a differential pressure transducer. Alternatively, or additionally, illustratively, in an embodiment, the filter assembly can include a fluid density sensor and/or a volumetric flow rate sensor (e.g., arranged in a port and/or a fluid passage within the housing), and in those embodiments including both a fluid density sensor and a volumetric flow rate sensor, the use of both signals allows determination of mass flow.

Information can be transmitted to and from the filter assembly, and a plurality of assemblies can be operated in a system. For example, FIGS. 6A-6C are diagrammatic views showing the transmission of signals through illustrative systems 2000 according to exemplary embodiments of the invention, including first and second filter assemblies 1000, 1000' (FIGS. 6A and 6B; FIG. 6C shows only one filter assembly, 1000'), the transmission of signals from the respective RFID signal generator/controllers 910, 910' through a local router gateway 3000 provided with internet access, such that the signal is broadcast to, for example, a cloud-based application or a web application programming interface (API), where an end-user can configure access through a secure system to authorized site personnel via any cloud- or web-enabled device 3100.

If desired, the system can further comprise at least one sensor node, that can be arranged external to the filter assembly or assemblies, wherein the sensor node comprises one or more sensors, such as, for example a fluid condition sensor and/or a water sensor (e.g., for monitoring dissolved water), preferably, wherein the one or more sensor nodes communicate through the gateway router.

The first housing end comprising a removable cover and first housing end body can have a variety of configurations. In the embodiment illustrated in FIGS. 1B-1D and 1F, the first housing end 510 comprising a removable cover 510A and a removable first housing end body 510B comprising an external cylindrical surface (preferably including threads, and one or more grooves for receiving o-rings, wherein the o-rings help provide a seal against pressurized flow (o-ring 505A) and keep dirt out of threads in the internal cylindrical surface of the housing body 575 (o-ring 505B)). While FIG. 1C shows cover 510A separable from body 510B, they can be combinable and thus removable from the housing 575 (and, if desired, insertable into the housing 575) as a combined unit, or a unitary (e.g., integral) component.

The illustrated cover includes an annular channel for receiving the second antenna 902, and, using FIGS. 1D and 1F for reference, the first housing end body 510B comprising a bore 930 for receiving a gland 934 therein, the gland comprising a central bore for receiving a cable 960 communicating with the second antenna 902 and the third antenna 903, a recess for receiving a holder 933 holding the third antenna, such that the third antenna faces the interior of the housing body 575, and a first housing end body bottom end 525 with a bottom end surface 525A facing the interior space of the housing body.

The illustrated housing body 575 comprises a mounting surface 579A (shown on a lip 579) for receiving the first antenna, an internal cylindrical surface comprising threads that can engage with the threads of the removable body 510B, and an inner wall 585 surrounding the filter assembly and providing an interior space for the filter assembly.

The illustrated second housing end 550 comprises an inlet 551 and an outlet 552, defining a fluid flow path, wherein, when the filter 8 is disposed in the housing, the filter is disposed across the fluid flow path. Preferably, the second housing end further comprises one or more sensor ports 555, for receiving one or more sensors 1100 such as fluid condition sensors.

The housing 500 can be fabricated from any suitable rigid impervious material, including any impervious thermoplastic material, which is compatible with the fluid being processed. For example, the housing can be fabricated from a polymer, such as an acrylic, polypropylene, polystyrene, or a polycarbonated resin.

A variety of fluids can be filtered in accordance with embodiments of the invention. Preferably, the fluid is a liquid, of any suitable viscosity. In some embodiments, the fluid is, for example, a hydraulic fluid, or diesel fuel.

In accordance with embodiments of the invention, the filter and/or porous filter element can have a variety of configurations, including planar, pleated, and hollow cylindrical. A variety of filters and porous filter elements are suitable for use in embodiments of the invention. Fluid flow through the filter can be outside-to-inside, or inside-to-outside.

The porous filter element, which in the illustrated embodiments has a hollow, generally cylindrical or tubular form, can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

In the illustrated embodiments, the porous filter element comprises a pleated filter element including a plurality of longitudinally extending pleats. The pleats may be in a generally laid-over or curved form or may extend radially outwardly (such as, e.g., in fan-pleats). The filter element may also include a wrap member (e.g., as described above), which extending about the exterior of the filter element. A variety of porous filter elements are suitable for use in embodiments of the invention, for example, as disclosed in U.S. Patent Application Publication 2015/0375143 A1.

The filter and/or porous filter element can include additional elements, layers, or components, that can have different structures and/or functions, e.g., at least one of any one or more of the following: prefiltration, support, drainage, spacing and cushioning. Illustratively, the filter can also include at least one additional element such as a mesh and/or a screen.

In accordance with embodiments of the invention, the porous element comprises at least one porous filter medium, such as paper filter medium, a fibrous filter medium and/or a membrane, for example, a nanoporous membrane, for example, a membrane having pores of diameter between 1 nm and 100 nm, or a microporous membrane or microporous fibrous medium having pores of diameter between 1 μm and 10 μm. The porous element can comprise an ultrafiltration or reverse osmosis membrane.

The porous filter element can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the filter element has a CWST of greater than about 58 dynes/cm (about $58 \times 10^{-5}$ N/cm), or about 66 dynes/cm (about $66 \times 10^{-5}$ N/cm) or more, or about 75 dynes/cm (about $75 \times 10^{-5}$ N/cm) or more.

The surface characteristics of the porous filter element can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface.

FIGS. 3A and 3B illustrate two exemplary embodiments of filters 8 useful according to the present invention. The filter 8 has a generally cylindrical form and two end caps 40, 41 which seal the ends of a filter element 10. A portion of the top end cap 40 and the filter element 10 is partially cut away to show the interior of the filter 8. A helical wrap member 50 may be disposed along the outer periphery of the filter element 10. In a preferred embodiment, the filter element 10 may comprise a plurality of longitudinal curved pleats 12 or radial pleats (not shown). Those skilled in the art will also appreciate that the wrap member 50 could also be used for non-pleated filter elements, such as a hollow cylindrical mass of fibers.

As shown in FIG. 3A, a cylindrical core 20 may be coaxially disposed along the inner periphery of the filter element 10. A core 20 is typically used when the filter is subject to radially inward (outside to inside) fluid flow. Alternatively, when the filter element 10 is subject to radially outward (inside to outside) fluid flow, a cylindrical core may not be necessary as shown in FIG. 3B.

As shown in FIGS. 3A and 3B, each pleat 12 has two legs 12a which are joined to one another, (1) at the crown or crest 12b of the outer periphery of the filter element 10, and (2) to a leg 12a of an adjacent pleat 12 at the root 12c of the inner periphery of the filter element 10. Each leg 12a has an internal surface 12d which opposes the internal surface 12d of the other leg 12a in the same pleat 12. Each leg 12a also has an external surface 12e which opposes the external surface 12e of a leg 12a of an adjacent pleat 12. When the filter element 10 is being used such that fluid flows radially inwardly through the element 10, the internal surfaces 12d of the legs 12a form the downstream surface of the filter element 10, while the external surfaces 12e form the upstream surface of the filter element 10. Alternatively, when the filter element 10 is subjected to radially outward fluid flow, the internal surfaces 12d and the external surfaces 12e form the upstream and downstream surfaces, respectively, of the filter element 10.

Those skilled in the art will appreciate that the filter element 10 may comprise curved or laid-over pleats which are illustrated in the figures or conventional radial pleats (not shown). In one embodiment, the pleat legs 12a may have equal length legs. In another embodiment, the pleat legs 12a may have with slightly different lengths or unequal length legs. For many filter elements 10, especially those formed from a multilayer composite, it is easier and more reliable to form the pleated filter element 10 if the adjoining legs 12a of each curved pleat have slightly different lengths. Such pleats 12 will be referred to as pleats with unequal legs.

As shown in FIGS. 3A and 3B, the opposing inner surfaces 12d of the legs 12a of each pleat 12 contact each other over substantially the entire height of the legs 12a and of the pleat 12 and over a continuous region extending for a significant portion of the axial length of the filter element 10. In addition, the opposing external surfaces 12e of the legs 12a of adjacent pleats 12 contact each other over substantially the entire height of the adjacent pleats 12 and legs 12a and over a continuous region extending for a significant portion of the axial length of the filter element. The height of the pleats 12 and the legs 12a is measured in a direction along the surfaces of the legs 12a and extends from the inner periphery to the outer periphery of the filter element 10.

The filter element 10 includes a filter medium 14 and drainage medium disposed on at least one side, preferably the upstream side, and more preferably on both the upstream and downstream sides of the filter medium 14. When radial pleats are used in the filter element 10, sufficient space typically exists between the upstream and downstream sides of the pleat legs so that fluid may evenly flow to or from substantially all portions of the surface of the filter medium 14. In a preferred embodiment of the present invention, the opposing surfaces of the curved pleats 12 are pressed into contact with each other. Consequently, the strands of the drainage mesh of each leg 12a of the pleats 12 are pressed against the strands of the drainage mesh of an adjacent leg 12a of the pleats 12. The drainage means prevents opposing surfaces of the filter medium 14 from coming into contact with one another and enables fluid to evenly flow to or from substantially all portions of the surface of the filter medium 14 when curved pleats 12 are used in the filter element. Thus, virtually the entire surface area of the filter medium 14 may be effectively used for filtration.

In the illustrated embodiments, the filter element 10 comprises a three-layer composite of a filter medium 14, upstream drainage in the form of an upstream drainage layer 16 disposed on the upstream surface of the filter medium 14, and downstream drainage in the form of a downstream drainage layer 18 disposed on the downstream surface of the filter medium 14. Here, the upstream and downstream surfaces refer to a filter which is subjected to radially inward fluid flow. When the filter is subjected to radially outward fluid flow, the upstream and downstream surfaces are reversed. The layers forming the filter element 10 can be formed into a composite by conventional filter manufacturing techniques, either prior to or simultaneously with corrugation.

It is possible for the filter medium 14 to include two or more layers having different filtering characteristics, e.g., with one layer acting as a prefilter for the second layer.

In another embodiment, the filter element 10 may comprise several integral regions, including a single, unitary porous sheet having a finely-pored center region, which serves as a filter medium, and coarsely-pored upstream and/or downstream regions which serve as the drainage layers. However, the drainage layers are preferably distinct layers separate from the filter medium. The upstream and downstream drainage layers 16 and 18 can be of the same or different construction. The upstream and downstream drainage layers 16 and 18 can be made of any materials having suitable edgewise flow characteristics, i.e., suitable resistance to fluid flow through the layer in a direction parallel to its surface. The edgewise flow resistance of the drainage layer is preferably low enough that the pressure drop in the drainage layer is less than the pressure drop across the filter medium, thereby providing an even distribution of fluid along the surface of the filter medium. The drainage layers can be in the form of a mesh or screen or a porous woven or non-woven sheet.

Meshes are particularly suitable as drainage layers when the filter medium is a fibrous laid-down medium. On the other hand, when the filter medium is a membrane, a woven or non-woven fabric may be more suitable for use as the drainage layer because a fabric is usually smoother than a mesh and produces less abrasion of adjoining layers of the filter composite.

The filter composite forming the filter element 10 may include other layers in addition to the filter medium 14 and the drainage layers 16 and 18. For example, in order to prevent abrasion of the filter medium due to rubbing contact with the drainage layers when the pleats expand and contract during pressure fluctuations of the fluid system in which the filter is installed, a cushioning layer can be disposed between the filter medium and one or both of the drainage layers. The cushioning layer is preferably made of a material smoother than the drainage layers and having a higher resistance to abrasion than the filter medium 14. For example, when the drainage layers are made of an extruded nylon mesh, an example of a suitable cushioning layer is a polyester non-woven fabric.

The filter element 10 illustrated in FIGS. 3A and 3B can be manufactured by a variety of techniques. In one technique, the filter composite is first corrugated to form a corrugated sheet, cut to a suitable length or suitable number of pleats, and then formed into a cylindrical shape. The lengthwise edges of the corrugated sheet are then sealed to each other by conventional means to form a cylindrical filter element 10. When the filter is subject to radially inward fluid flow, the pleats of the filter element 10 are then laid over as the filter element 10 is inserted into a cage 30. After the filter element 10 has been fit into the cage 30, a core 20 is inserted into the hollow center of the filter element 10, and then end caps 40 are attached to the ends of the filter element 10 to form a completed filter.

Preferably, a filter according to the present invention will be equipped with end caps 40, 41 at one or both ends of the filter element 10. The end caps 40, 41 can be either blind or open end caps, and may be made of a material which is suitable for the filter conditions and the other materials of the filter components to which the end caps are to be joined. Preferably, the end caps 40, 41 are attached to the filter element 10, but they may also be attached to the core 20 or the cage 30. Conventional techniques can be used to attach the end caps to the filter element 10, such as by use of an epoxy, by polycapping, or by spin welding.

When the filter element 10 is subjected to radially inward fluid flow, the presence of a core 20 is usually desirable because the core 20 supports the inner periphery of the filter element 10 against forces in the radial direction and also helps to give the filter axial strength and rigidity against bending. The core 20 may be of conventional design and may be made of any material having sufficient strength and which is compatible with the fluid being filtered. Openings 21 are formed through the wall of the core 20 to permit the passage of fluid between the outside and the center of the core 20.

However, depending upon the forces acting on the filter element 10 during filtration, it may be possible to omit the core 20. For example, when the fluid flow through the filter element 10 is primarily from the inside to the outside, radially inward forces on the filter element 10 may be absent or so low that a core 20 becomes unnecessary, enabling a reduction in the weight and cost of the filter. The curved pleat configuration shown in FIGS. 3A and 3B permits uniform pleat support and acts to distribute concentrated loads evenly across the filter element. This minimizes pleat movement and increases the ability of the pleats to retain particles in pulsating flow systems.

A filter according to the present invention preferably includes a component for retaining the filter element 10 in a cylindrical configuration. A suitable component for retaining the pleats is a sheet of material wrapped around the filter element with sufficient tension to prevent the pleats from unbending from their pleated state. In FIGS. 3A and 3B, a helical wrap member 50 comprising a parallel-sided strip of a flexible material which is helically wrapped about the filter element 10 in a plurality of turns is provided. The wrap member 50 can be made of any material which is compatible with the fluid being filtered. If the wrap member 50 completely envelops the outer periphery of the filter element 10, the wrap member 50 is preferably porous. While the filter element preferably comprises pleats, the wrap might also be useful for non-pleated filter packs, such as a hollow cylindrical mass of fibers.

The wrap member 50 is made of a material sufficiently strong enough to provide sufficient support against radially outward forces and resist the stresses resulting from inside-to-outside flow. The tension of the wrap member 50 can be selected in accordance with the expected filtering conditions.

The wrap member 50 can be wrapped around the filter element 10 with or without overlap between adjacent turns of the wrap member 50. For example, adjacent turns of the wrap member 50 can abut each other with substantially no overlap, or by employing an overlap, it is possible to wrap multiple layers of the wrap member 50 around the filter element 10. However, it has been found that if the wrap member 50 includes an unobstructed opening, the dirt capacity of the filter element 10 can be greatly increased compared to that of an unwrapped pleated filter element or compared to a pleated filter element completely covered in a wrap member. The openings may be holes formed in the material of the wrap member 50 itself, or they may be gaps 52 left between adjacent turns of the wrap member 50.

In the embodiment of FIGS. 3A and 3B, the wrap member 50 is wrapped around the filter element 10 so as to leave openings in the form of a helical gap 52 between adjacent turns. The wrap member 50 comprises a composite strip of two or more layers, including at least an outer layer 54 and an inner layer 56. The outer layer 54 serves as a "carrier" enabling the wrap member 50 to be securely attached to the exterior of the filter element 10 including, for example, to the crowns 12b of the pleats 12. The outer layer 54 may be formed from a variety of materials, including for example, spun bonded thermoplastic materials, which are compatible with the fluid being filtered, and which will readily bond to an adhesive such as a hot melt adhesive. The outer layer 54 is preferably porous, allowing the hot melt adhesive to penetrate within the layer 54 to form a stronger bond. The outer layer might also be perforated. For many applications, a porous, polymeric, non-woven material available from Reemay Corporation under the trade designation Reemay is suitable. Laminates of the Reemay material can also be employed. Examples of other suitable materials are oil board paper and Mylar film.

The inner layer 56, which provides strength for the wrap composite, provides support against radially outward forces and resists the stresses resulting from inside-to-outside flow and pressure drops across the filter element. The inner layer 56 preferably is a glass or carbon fiber reinforced thermoplastic strip including, for example, a glass or carbon fiber reinforced polyphenylene sulfide (PPS) strip. The glass fiber content preferably may be up to about 70% by weight and the carbon fiber content preferably may be up to about 60% by weight. Polybutylene terephthalate (PUT) reinforced with glass or carbon fibers or uniaxial fabrics or steel ribbons may also be useful for some fluids. Similarly, nylon or polypropylene reinforced with glass or carbon fibers would be useful for mild, non-aggressive fluids such as water.

For filter elements 10 having an outer diameter of about four inches or less, the inner layer 56 preferably should have an elastic modulus of at least about 3 million psi (3 MPSI) to withstand a 150 psid (inside to outside) pressure drop. In a larger filter element 10, including, for example, elements having an outer diameter between four inches and six inches, an inner layer 56 preferably should be able to withstand a 100 psid pressure drop. To withstand up to 150 psid pressure drop, the inner layer 56 preferably should have an elastic modulus of at least about 12 MPSI. To achieve the desired strength characteristics, the inner layer 56 may be formed by stacking multiple layers of the reinforced strips on top of each other.

The outer and inner layers 54, 56 are preferably joined to one another to facilitate manufacture, although with careful manufacturing, they need not be joined together. The outer and inner layers 54, 56 may be joined to one another by (1) a double-sided adhesive tape applied between the two layers, (2) a hot melt adhesive (polyamide hot melt or EVA hot melt) applied between the two layers, or (3) ultrasonically spot welding the two layers.

If desired, the wrap member 50 may be attached to the exterior of the filter element 10 by applying a bead of hot melt adhesive on both edges of the inner layer. On each edge, the hot melt adhesive may flow into the porous outer layer and the edge of the inner layer, preventing any fiber migration from the inner layer.

The wrap member 50 is preferably secured in a manner which prevents it from becoming unwound from the filter element 10. In a preferred embodiment, the wrap member 50 is wrapped around the filter element 10 without directly attaching the two together, securing only the two ends of the wrap member 50 to the end caps 40, 41. Before the wrap member 50 is attached to the end caps 40 and/or 41, the ends of the wrap member 50 can be cut at angle, so that substantially the entire length of end may be bonded into the end cap.

After the filter composite (i.e., filter medium and drainage layers) is pleated and formed into a cylindrical shape, the lengthwise edges of the pleated filter composite are sealed to each other to form a cylindrical pleated filter pack. Before the hot melt adhesive beads 58 solidify and before end capping, the wrap member 50 may be helically wrapped around the length of the filter packs. The tension applied to the wrap member 50 should be sufficient to prevent movement of the pleats 12 or ripples in the wrap member 50 between the pleats 12, without crushing or closing off the pleats 12 of the filter pack. The filter pack may be manufactured in as suitable lengths, e.g., 42-44 inch lengths, and the wrap member 50 is applied to the entire 42-44 inch length. Thereafter, the filter pack may be cut to desired lengths of, for example, 40 inches, 20 inches, 13 inches, 8 inches, or 4 inches.

It will be appreciated that the outer layer 54 is preferably wider than the inner layer 56. Thus, when the end of the wrap member 50 is bonded into the end caps 40, 41 the outer layer 54 will help prevent the inner layer 56, which is relatively stiffer than the outer layer 54, from separating from the end cap 40 and filter pack. The materials of the outer layer 54 may also bond better to the adhesives and potting materials used in manufacturing the filter elements, than the materials used to make the inner layer 56. The wider outer layer 54, which is relatively more flexible and typically has better handling characteristics than the materials used in the inner layer 56, provides better handling and performance during the manufacturing process, and minimizes separation between the inner layer 56 and the end caps 40, 41 and filter pack, while maintaining the relative strength characteristics of the inner layer 56.

The wider outer layer 54 also keeps the spread of the adhesive within the periphery of the wrap and minimizes the undesirable mess which may occur if the adhesive spreads outside the wrap periphery. It is preferable that a gap 52 is formed between adjacent turns of the helical wrap member 50 so that gap 52 is no greater than the width of the inner layer 56. For some applications, the width X of gap 52 between the adjacent helical wrap member 50 is the same distance as the width X of the inner wrap 56. In one embodiment, it has been found that an inner layer width of about 0.4 inches is sufficient for many applications. In one preferred embodiment, the outer layer 54 is about twice as wide (2×) as the inner layer 54 so the total distance from the edge of an inner layer 56 to the edge of the next adjacent inner layer is about 2×.

After the combined filter pack and wrap member 50 are cut to the desired length, each filter pack is end capped to form the filter element 10. The end caps 40, 41 may be applied using a potting compound, including, for example, an epoxy or a polyurethane, or a hot melt adhesive. The end caps 40, 41 may be polymeric. Alternatively, a polymeric end cap may be applied to the end of the filter pack/wrap end 60 by melting a portion of the polymeric end cap and inserting the end of the filter pack/wrap end 60 into the molten portion of the end caps 40, 41. In either case, the end of the filter pack/wrap end 60 preferably should be inserted preferably at least 50 thousandths of an inch, and more preferably about 100 thousandths of an inch, into the potting compound or the molten plastic to ensure the wrap member 50 is properly bonded to the filter pack at the end caps 40, 41.

Another method of securing the wrap member 50 is to attach it to the filter element 10 by a bonding agent, such a hot melt adhesive, which is applied to the wrap member 50 as it is wound around the filter element 10. The bonding agent can be applied to the wrap member 50 in the form of a continuous or intermittent bead which spirals around the filter element 10 parallel to the edges of the wrap member 50. Alternatively, if the wrap member 50 is made of polymeric material, it may be fusion bonded to the filter element 10 by a hot wheel which travels down the length of the filter element 10 as the filter element 10 is rotated. The wrap member 50 can be attached directly to the filter element 10, or if there is overlap between adjacent turns of the wrap member 50, the adjacent turns can be attached directly to one another.

The following examples further illustrate the invention but, of course, should not be construed as in any way limiting its scope.

Example 1

This example describes a filter assembly according to an embodiment of the invention.

Using FIGS. 1F and 2 for general reference, wherein the RFID tag 900 is attached to the inner surface of the end cap 40 via a heat-staking process, the first, second, and third antennas (901, 902, 903) are tuned to operate at or near 13.56 MHz (wavelength ~22.1 m) and are implemented as copper traces on circuit boards. Matching components on each of the antenna circuit boards allow fine tuning of the impedance (about 50 ohms) and resonant frequency. The RFID reader integrated circuit is connected to the first antenna 901 with a coaxial cable. The first and second antennas each act as one-half of an electromagnetically coupled coil that transfer the signal from the RFID reader to the cap assembly across a nominal 3.8 mm gap (925). The first antenna 901 resides in the housing body 575 and is stationary in relation to the housing body. The second antenna 902 is part of the removable cover 510A that is attached to the removable first housing end body 510B.

The RFID signal is routed to the third antenna 903 through a pressure gland assembly 934 to allow for crossing into the high pressure side of the filter housing. The third antenna 903 is located in the fluid chamber and is electromagnetically coupled to the RFID tag 900 located on the filter end cap 40. The distance 935 between the third antenna 903 and the RFID tag 900 is 9.26 mm.

Example 2

This example describes the operation of an illustrative filter system according to an embodiment of the invention, including first and second filter assemblies, wherein the first filter assembly is arranged in a high pressure line (working pressure typically about 400 Bar or less), and the second filter assembly (utilized for filtration of recycled fluid) is arranged in a low pressure (return) line (working pressure typically about 20 Bar or less). In some embodiments, the use of a second filter assembly arranged in the lower pressure portion of the hydraulic circuit can be desirable to ensure clean fluid is returned to the reservoir.

Typically, an end user will define an end-user process (or "customer process") for use in the system, including various target parameters, and the parameters may differ depending on the fluid to be filtered, e.g., hydraulic fluid, lubrication fluid, etc. For example, the process may define hours of service filter life (run time), differential pressure, water ingression, fluid condition (e.g., contamination, dilution, oxidation, additive depletion, and/or presence of particulate(s), fluid temperature, fluid viscosity, fluid density, fluid dielectric, and flow rate). In some embodiments, filter element performance set points and/or operating limits are stored and monitoring includes determining whether one or more stored performance set points and/or operating limits have been exceeded.

Typically, the customer process includes converting the hydraulic energy created by the feed pump into another form of work (force/pressure, rotary or linear motion, etc.) via actuators and effectors such as hydraulic cylinders, hydraulic motors, or in the case of a lubrication system, by circulating lubricant through rotating machinery such as gearboxes or to the customer process as coolant. If desired, the customer process can be duplicated multiple times—each with its own valves, actuators, machinery, etc.

Using FIG. 6A for general reference, the system 2000 includes first and second filter assemblies as described above, wherein one assembly 1000 is arranged as a return line filter node (lower pressure/return line filter assembly), and the other assembly 1000' is arranged as a high pressure filter node. In this Example, the first and second filter assemblies are configured as described in Example 1, wherein the labeled components in the second assembly include "'" as part of their labels (e.g., 1100').

The illustrated system further includes a sensor node 2500, including an electronics box that can automatically collect data and wirelessly report the data (e.g., fluid health) to a WiFi gateway 3000 (that functions as a bridge between one network and another, e.g., two wireless communication frequencies) and interfaces with a water sensor 2551 and a fluid property sensor (e.g., fluid density sensor) 2552, wherein the sensors are preferably attached to a sensor manifold 2550, and the sensor node is located on the low pressure side of the system (upstream of the feed pump) within about 3 meters from the sensor manifold 2550 including the sensors 2551, 2552.

In this Example, the sensor node is electrically connected to the water sensor through a half-duplex RS-485 interface, using a 6-conductor cable, and electrically connected to the fluid property sensor through a CAN Bus interface, using a 4-conductor cable.

The sensor node is connected to a 24V DC power source using a 2-conductor cable.

The filter assemblies 1000, 1000' each include an RFID signal generator/controller 910, 910' including an electronics box that wirelessly reports differential pressure measurements to the WiFi. The RFID signal generator/controller 910, 910' is mounted to the side of the filter housing above the differential pressure sensor 1100, 1100' and the RFID signal generator/controller 910, 910' is electrically connected to the respective differential pressure sensor 1100, 1100' through a half-duplex RS-485 interface, using a 6-conductor cable.

A general overview of the operation of a system according to an embodiment of the invention is as follows:

Fluid is pumped out of a reservoir 2100 on the high pressure side and through a sensor node 2550 by a pump 2200, and the fluid passes through a first filter assembly 1000', wherein the fluid is filtered. The RFID signal generator/controller 910' wirelessly reports fluid and filter conditions via the gateway 3000 to the cloud as well as indicates on its electronic indication system (LEDs) its current status (wherein a red LED indicates a filter change is now required, an amber LED indicates the filter is approaching end-of-life and should be changed soon, and a green LED indicates the filter is ok) with filtering the fluid via the installed removable filter, and the sensor node reports detailed fluid conditions via the gateway 3000 to the cloud.

The data received by the filter and nodes is transmitted to cloud-based software application via the gateway and algorithms in the application process the data and determine if anomalous filter and/or fluid health conditions exist. If the monitored filter and fluid health conditions are approaching or at an unacceptable level (e.g., out of specification), an alarm is generated and a notification is sent, which can include a change in LED color from green to amber or red).

In order to recycle the fluid, the fluid passes through the second filter assembly 1000, and the RFID signal generator/controller 910 wirelessly reports fluid and filter conditions via the gateway to the cloud as well as indicates on its electronic indication system (LEDs) its current status along with filtering the fluid via the installed removable filter.

The fluid passes from the second filter assembly 1000 back to the reservoir 2100 to repeat the cycle.

Externally, an operator, technician and/or customer (for example) can use their internet capable device 3100 (computer, tablet, smartphone, etc) to connect to the cloud and view the reports generated by the filter assembly and sensor nodes. The operator, technician and/or customer can also visually inspect the indicators on the filter assemblies for current performance.

Example 3

This example describes the operation of an illustrative filter system according to an embodiment of the invention, including a filter assembly. The system also includes a reservoir, a pump, a sensor node, a flow meter, pressure gauges, and a WiFi gateway.

In this Example, the filter assembly is configured as described in Example 1. The RFID tag is programmed with the filter element part number.

The system further includes a sensor node, including an electronics box that can automatically collect data and wirelessly report the data (e.g., fluid health) to a WiFi gateway (that functions as a bridge between one network and another, e.g., two wireless communication frequencies) and interfaces with a fluid property sensor, wherein the sensor is attached to a sensor manifold, and the sensor node is located downstream of the feed pump.

In this Example, the sensor node is electrically connected to the fluid property sensor through a CAN Bus interface, using a 4-conductor cable. The sensor node is connected to a 24V DC power source using a 2-conductor cable.

The filter assembly includes an RFID signal generator/controller including an electronics box that wirelessly reports differential pressure measurements to the WiFi. The RFID signal generator/controller is mounted to the side of the filter housing above the differential pressure sensor and the RFID signal generator/controller is electrically connected to the differential pressure sensor through a half-duplex RS-485 interface, using a 6-conductor cable.

Hydraulic oil (Mobil DTE24), stored in at or near atmospheric pressure, is pumped out of the reservoir by a pump, and the fluid passes through the filter assembly and the sensor node. The flow rate is controlled by varying the speed of the pump, and the flow rate is read from the flow meter, that is arranged downstream of the filter assembly. Pressure gauges mounted upstream and downstream of the filter assembly provide visual confirmation of the differential pressure. The RFID signal generator/controller wirelessly reports fluid and filter conditions via the gateway to the cloud, and the sensor node reports detailed fluid conditions via the gateway to the cloud.

Testing is carried out at flow rates varying from about 2 GPM to about 10 GPM, and feed pressures of about 20 PSIG to about 100 PSIG.

Data read from the RFID tag on the filter element are consistent throughout the testing, and data from the fluid property sensor and the differential pressure sensor are reported accurately and are consistent with the expected values for the oil. The data are accessible by an end user from a laptop or smart device.

Example 4

This example describes the operation of an illustrative filter system according to an embodiment of the invention, including a filter assembly, as generally illustrated in FIG. 6C.

In this Example, the filter assembly is configured as described in Example 1. The RFID tag is programmed with the filter element part number.

Commercially available hydraulic oil stored in at or near atmospheric pressure in a dark room, is pumped out of the reservoir by a pump, and the fluid, pressurized to approximately 3000 psig (207 bar) at a flow rate of 20 gpm, passes through the filter assembly and the sensor node.

The maximum working system pressure is set by a pressure regulating device such as a bypassing regulator. Installed downstream of the pump and in the high pressure side, is a filter housing assembly. The filter housing assembly includes the filter element, filter bypass valve, a filter element differential pressure transducer, filter element RFID reader, associated electronics, wireless communications, and an illuminated visual indicator/beacon viewable from 360 degrees.

The electronics monitor the differential pressure of the filter element, which increases with time as dirt particles or wear debris are captured, and verifies that the correct element part number is installed via the RFID tag located on the filter element. The electronics also contain wireless communications that transmit the sensor data to the gateway which in turn transmits the sensor data to the cloud.

A bypass valve is included in a filter housing such that the maximum differential pressure across the filter membrane is limited in order to prevent damage to the filter and to prohibit the blockage of flow should the element become clogged with contaminants. The bypass valve is set to open at 65 psid (4.5 bard). In a normal state of operation where there remains adequate filter life and the filter element differential pressure is below approximately 80% of the bypass valve setting (~52 psid), the visual indicator/beacon is illuminated with green LEDs.

When the filter loads to such a point where the practical service life of the filter element is nearing its end and differential pressure exceeds approximately 80% of the bypass valve setting, the visual indicator/beacon is illuminated with amber LEDs. The end user(s), typically a maintenance supervisor or technician, will also receive a notification on an internet capable device. At this point, it should be understood by the end user that the filter element should be replaced with a new one of the same part number in the near future. However, if the filter element is not serviced and the filter differential pressure continues to increase to the point where the bypass valve is nearing the point of opening, which in this case is 65 psid, then the visual indicator/beacon is illuminated with red LEDS and an alarm notification will be sent to the end users' devices.

Installed downstream of the customer process in the low pressure return line, which typically is at approximately 1 bar, is the sensor manifold and associated electronics and communications module. The sensor node communications module wirelessly transmits data to the gateway and ultimately to the cloud in the same manner as the filter housing. The hydraulic fluid flow returned from the customer process passes by or through the fluid property sensor (and optionally, a dissolved water sensor). The sensors continuously monitor critical fluid health parameters and will alert the end user if these parameters are approaching or have exceeded the limits for the hydraulic fluid or if a process upset such as water ingression from the upstream process or a leaking heat exchanger, for example, has occurred. In the case where a fluid condition limit is approached or exceeded, notification will be sent to the end users' devices of choice in the same manner as the previously described filter condition notifications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter assembly comprising
   (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element;
      (i) the filter comprising a first end cap and a second end cap, and the porous filter element comprising a first filter end and a second filter end, the first end cap sealed to the first filter end, and the second end cap sealed to the second filter end;
      (ii) an RFID tag secured on, or near, the first end cap or the second end cap;
      (iii) a first antenna, arranged in or on the housing body;
      (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween;
      (v) a third antenna, arranged in or on the first housing end body, wherein the third antenna is spaced from the RFID tag, and the third antenna is arranged to wirelessly send a signal to, and wirelessly receive a signal from, the RFID tag;
      (vi) an RFID signal generator/controller; and,
      (vii) a first cable, having a first cable first end and a first cable second end, wherein the first cable first end is coupled to the second antenna, and the first cable second end is coupled to the third antenna;
   wherein the filter assembly is arranged to allow a signal to pass from the RFID signal generator/controller to the first antenna, from the first antenna to the second antenna, from the second antenna to the third antenna, and from the third antenna to the RFID tag, and to allow a signal to pass from the RFID tag to the third antenna, from the third antenna to the second antenna, from the second antenna to the first antenna, and from the first antenna to the RFID signal generator/controller.

2. The filter assembly of claim 1, further comprising at least one fluid sensor, arranged to sense a condition of the fluid, wherein the at least one fluid sensor communicates with the RFID signal generator/controller.

3. The filter assembly of claim 1, wherein the first end cap is a closed end cap.

4. The filter assembly of claim 1, wherein the first end cap is an open end cap.

5. The filter assembly of claim 1, wherein the RFID tag is attached to the first end cap.

6. The filter assembly of claim 1, wherein the porous filter element is pleated.

7. The filter assembly of claim 1, further comprising a signal device comprising a changeable visual signal indicator, attached to the housing.

8. A system for monitoring fluid processing comprising:
(A) a filter assembly comprising
  (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element;
    (i) the filter comprising a first end cap and a second end cap, and the porous filter element comprising a first filter end and a second filter end, the first end cap sealed to the first filter end, and the second end cap sealed to the second filter end;
    (ii) an RFID tag secured on, or near, the first end cap or the second end cap;
    (iii) a first antenna, arranged in or on the housing body;
    (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween;
    (v) a third antenna, arranged in or on the first housing end body, wherein the third antenna is spaced from the RFID tag, and the third antenna is arranged to wirelessly send a signal to, and wirelessly receive a signal from, the RFID tag;
    (vi) an RFID signal generator/controller; and,
    (vii) a first cable, having a first cable first end and a first cable second end, wherein the first cable first end is coupled to the second antenna, and the first cable second end is coupled to the third antenna;
  wherein the filter assembly is arranged to allow a signal to pass from the RFID signal generator/controller to the first antenna, from the first antenna to the second antenna, from the second antenna to the third antenna, and from the third antenna to the RFID tag, and to allow a signal to pass from the RFID tag to the third antenna, from the third antenna to the second antenna, from the second antenna to the first antenna, and from the first antenna to the RFID signal generator/controller;

(B) a router gateway providing internet access, the router gateway in communication with the RFID signal generator/controller, and (C) at least one cloud or web enabled device capable of accessing the internet and receiving information regarding the filter assembly.

9. A method for monitoring fluid processing in a filter assembly including an RFID tag and an RFID signal generator/controller, the method comprising:
(A) receiving information regarding fluid passing through a filter assembly comprising
  (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element;
    (i) the filter comprising a first end cap and a second end cap, and the porous filter element comprising a first filter end and a second filter end, the first end cap sealed to the first filter end, and the second end cap sealed to the second filter end;
    (ii) the RFID tag secured on, or near, the first end cap or the second end cap;
    (iii) a first antenna, arranged in or on the housing body;
    (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween;
    (v) a third antenna, arranged in or on the first housing end body, wherein the third antenna is spaced from the RFID tag, and the third antenna is arranged to wirelessly send a signal to, and wirelessly receive a signal from, the RFID tag;
    (vi) the RFID signal generator/controller; and,
    (vii) a first cable, having a first cable first end and a first cable second end, wherein the first cable first end is coupled to the second antenna, and the first cable second end is coupled to the third antenna;
  wherein the filter assembly is arranged to allow a signal to pass from the RFID signal generator/controller to the first antenna, from the first antenna to the second antenna, from the second antenna to the third antenna, and from the third antenna to the RFID tag, and to allow a signal to pass from the RFID tag to the third antenna, from the third antenna to the second antenna, from the second antenna to the first antenna, and from the first antenna to the RFID signal generator/controller.

10. The method of claim 9, wherein the information comprises any one or more of: filter differential pressure, flow rate, and filter element part number.

11. The method of claim 9, comprising accessing the internet using a cloud or web enabled device, and receiving the information.

12. A method for monitoring fluid processing in a filter assembly including an RFID tag and an RFID signal generator/controller communicating with a router gateway providing internet access, the method comprising:
(A) accessing the internet using a cloud or web enabled device, and (B) receiving information regarding fluid passing through a filter assembly comprising
  (a) a housing having a first housing end, a housing body, and a second housing end, the housing containing a generally cylindrical filter comprising a porous filter element, wherein at least the first housing end comprises a removable cover and a first housing end body, wherein the housing is arranged to provide a fluid flow path through the filter, such that fluid is filtered as it passes through the porous filter element;
    (i) the filter comprising a first end cap and a second end cap, and the porous filter element comprising a first filter end and a second filter end, the first end cap sealed to the first filter end, and the second end cap sealed to the second filter end;
    (ii) the RFID tag secured on, or near, the first end cap or the second end cap;
    (iii) a first antenna, arranged in or on the housing body;
    (iv) a second antenna, arranged in or on the removable cover, wherein the first antenna and the second antenna are generally coaxially arranged and separated by a gap such that the first antenna and the second antenna are inductively coupled, allowing a wireless signal to pass therebetween;
    (v) a third antenna, arranged in or on the first housing end body, wherein the third antenna is spaced from the RFID tag, and the third antenna is arranged to wirelessly send a signal to, and wirelessly receive a signal from, the RFID tag;
    (vi) the RFID signal generator/controller; and,
    (vii) a first cable, having a first cable first end and a first cable second end, wherein the first cable first end is coupled to the second antenna, and the first cable second end is coupled to the third antenna;
  wherein the filter assembly is arranged to allow a signal to pass from the RFID signal generator/controller to the first antenna, from the first antenna to the second antenna, from the second antenna to the third antenna, and from the third antenna to the RFID tag, and to allow a signal to pass from the RFID tag to the third antenna, from the third antenna to the second antenna, from the second antenna to the first antenna, and from the first antenna to the RFID signal generator/controller.

13. The system of claim 8, further comprising a fluid density sensor.

14. The system of claim 8, further comprising a volumetric flow rate sensor.

15. The filter assembly of claim 1, further comprising at least one fluid condition sensor, arranged to sense a condition of the fluid passing through the filter assembly, wherein the fluid condition sensor communicates with the RFID signal generator/controller.

16. The filter assembly of claim 1, further comprising a fluid density sensor and a volumetric flow rate sensor, arranged to determine mass flow, wherein the fluid density sensor and the volumetric flow rate sensor communicate with the RFID signal generator/controller.

17. The filter assembly of claim 1, further comprising a fluid density sensor.

18. The filter assembly of claim 1, wherein the RFID tag is mounted to a support inserted in the filter.

19. The filter assembly of claim 18, wherein the RFID tag faces the first end cap wherein the first end cap comprises a closed end cap.

20. The system of claim 8, further comprising at least one sensor node communicating through the router gateway.

\* \* \* \* \*